United States Patent [19]

Wilson et al.

[11] Patent Number: 5,411,110
[45] Date of Patent: May 2, 1995

[54] POWER TRANSFER SYSTEM FOR A FOUR-WHEEL DRIVE VEHICLE

[75] Inventors: Robert J. Wilson, Warners; David Sperduti, Auburn; Randy W. Adler, Seneca Falls, all of N.Y.

[73] Assignee: New Venture Gear, Inc., Troy, Mich.

[21] Appl. No.: 228,670

[22] Filed: Apr. 18, 1994

Related U.S. Application Data

[63] Continuation-in-part of Ser. No. 28,299, Mar. 9, 1993, Pat. No. 5,363,938.

[51] Int. Cl.⁶ ............................................. B60K 17/354
[52] U.S. Cl. ....................................... 180/247; 180/233
[58] Field of Search ............... 180/233, 247, 248, 249, 180/250, 197; 364/426.02, 426.03

[56] References Cited

U.S. PATENT DOCUMENTS

| | | | |
|---|---|---|---|
| 4,417,641 | 11/1983 | Kageyama | 180/247 |
| 4,484,653 | 11/1984 | Horikoshi et al. | 180/233 |
| 4,711,317 | 12/1987 | Sakakiyama | 180/197 |
| 4,757,870 | 7/1988 | Torii et al. | 180/233 |
| 4,773,500 | 9/1988 | Naito et al. | 180/233 |
| 4,776,424 | 10/1988 | Naito | 180/233 |
| 4,846,298 | 7/1989 | Naito | 180/233 |
| 4,887,689 | 12/1989 | Naito | 180/233 |
| 4,989,686 | 2/1991 | Miller et al. | 180/197 |
| 4,991,679 | 2/1991 | Fujii et al. | 180/233 |
| 5,033,575 | 7/1991 | Takeshita et al. | 180/249 |
| 5,046,576 | 9/1991 | Miyawaki | 180/233 |
| 5,046,998 | 9/1991 | Frost | 180/247 |
| 5,078,660 | 1/1992 | Williams et al. | 475/84 |
| 5,152,362 | 10/1992 | Naito | 180/248 |
| 5,199,325 | 4/1993 | Reuter | 180/248 X |

Primary Examiner—Margaret A. Focarino
Assistant Examiner—Victor E. Johnson
Attorney, Agent, or Firm—Harness, Dickey & Pierce

[57] ABSTRACT

The present invention provides a power transfer system for a four-wheel drive vehicle which permits the vehicle operator to choose between operation in two-wheel drive and part-time four-wheel drive modes or an "on-demand" four-wheel drive mode. The power transfer system is adapted for use in conjunction with automatic disconnect-type drivelines and is operable for disabling the on-demand four-wheel drive feature upon the vehicle operator subsequently shifting into any of the two-wheel drive and part-time four-wheel drive modes.

33 Claims, 17 Drawing Sheets

POWER TRANSFER SYSTEM FOR A FOUR-WHEEL DRIVE VEHICLE

CROSS-REFERENCE

This application is a continuation-in-part of U.S. Ser. No. 08/028,299 filed Mar. 9, 1993 now U.S. Pat. No. 5,363,938.

BACKGROUND OF THE INVENTION

The present invention relates to a power transfer system for controlling the distribution of drive torque between the front and rear wheels of a four-wheel drive vehicle as a function of various system and operator-initiated inputs.

In view of increased consumer popularity in four-wheel drive vehicles, a plethora of power transfer systems are currently being utilized in vehicular driveline applications for selectively directing tractive power (i.e., drive torque) to the non-driven wheels of the vehicle. In many power transfer systems, a part-time transfer case is incorporated into the driveline and is normally operable in a two-wheel drive mode for delivering drive torque to the driven wheels. However, the vast majority of such part-time transfer cases include a mechanical "mode" shift mechanism which can be selectively actuated by the vehicle operator for rigidly coupling the non-driven wheels to the driven wheels for establishing a part-time four-wheel drive mode. As will be appreciated, a motor vehicle equipped with a part-time transfer case offers the vehicle operator the option of selectively shifting between the two-wheel drive mode during normal road conditions and the part-time four-wheel drive mode for operation under adverse road conditions.

Alternatively, it is known to use "on-demand" power transfer systems for automatically directing power to the non-driven wheels, without any input or action on the part of the vehicle operator, when traction is lost at the driven wheels. In one typical application, a viscous transmission device, such as a viscous coupling, is located in the driveline between the driven and non-driven wheels to provide "on-demand" four-wheel drive operation. Modernly, it is known to incorporate the "on-demand" feature into a transfer case by replacing the mechanical mode shift mechanism with a multi-disc clutch assembly that is interactively associated with an electronic control system and a sensor arrangement. During normal road conditions, the clutch assembly is maintained in a non-actuated state such that drive torque is only delivered to the driven wheels. However, when the sensors detect a low traction condition at the driven wheels, the clutch assembly is automatically actuated to deliver drive torque "on-demand" to the non-driven wheels. Moreover, the amount of drive torque transferred through the clutch assembly to the non-driven wheels can be varied as a function of specific vehicle dynamics, as detected by the sensor arrangement. One example of such an "on-demand" power transfer system is disclosed in U.S. Pat. No. 4,773,500 to Naito, et al wherein a hydraulically-actuated clutch assembly is operable for automatically controlling the amount of drive torque transferred to the non-driven wheels as a function of the wheel speed difference (i.e., the wheel slip) between the front and rear wheels.

While numerous variations of such hydraulically-actuated "on-demand" power transfer systems are known, they are primarily intended for road use in passenger cars and not for off-road recreational or sport/utility vehicles. In addition, such conventional "on-demand" transfer cases are single-mode power transfer mechanisms which do not provide means for permitting the vehicle operator to deliberately shift between traditional two-wheel drive and part-time four-wheel drive modes of operation. Moreover, most conventional "on-demand" power transfer systems are adapted for use in four-wheel drive vehicles wherein the non-driven wheels are rigidly connected to the transfer case for permitting instantaneous delivery of drive torque thereto when needed. As such, rotation of the non-driven wheels during operation of the motor vehicle causes its entire driveline to likewise be rotatably driven which detrimentally impacts fuel economy and component wear. Thus, the need exists to develop a transfer case for use in conjunction with disconnect-type drivelines and which incorporates an "on-demand" four-wheel drive feature that can be effectively over-ridden upon the vehicle operator selectively shifting the transfer case into either of a two-wheel drive mode or a part-time four-wheel drive mode.

SUMMARY OF THE INVENTION

Accordingly, it is an object of the present invention to overcome the disadvantages associated with conventional four-wheel drive systems by providing a power transfer system having an "on-demand" four-wheel drive feature incorporated into a transfer case that can be intentionally "over-ridden" upon the vehicle operator selectively shifting into a two-wheel drive mode or a part-time four-wheel drive mode. Thus, the present invention offers the vehicle operator the option of selecting the specific drive mode best-suited for operating the motor vehicle during normal or adverse road conditions as well as for off-road recreational use.

Pursuant to a related object of the present invention, the power transfer system is operably installed between the driven and non-driven wheels of a motor vehicle and is adapted to establish at least three distinct operative drive modes. In a preferred form, the power transfer system includes a transfer case equipped with a clutch assembly for selectively transferring drive torque to the non-driven wheels, actuator means for actuating the clutch assembly, sensor means for detecting various dynamic and operational characteristics of the vehicle and generating sensor input signals indicative thereof, mode select means for permitting the vehicle operator to select one of the distinct operative drive modes and generating a mode signal indicative thereof, and controller means for controlling actuation of the actuator means in response to the sensor input signals and the mode signal. The mode select means permits the vehicle operator to shift the transfer case into one of a two-wheel drive mode, a part-time four-wheel drive mode, and an "on-demand" mode. When the two-wheel drive mode is selected, the clutch assembly is de-actuated such that all drive torque is delivered to the driven wheels. When the part-time four-wheel drive mode is selected, the clutch assembly is fully actuated into a "lock-up" condition for distributing the drive torque between the driven and non-driven wheels as dictated by the tractive force generated at each respective set of wheels. When the "on-demand" mode is selected, the actuated condition of the clutch assembly is controllably modulated as a function of the sensor input signals for automatically varying the amount of drive torque directed to the non-driven wheels. In a preferred form, the power transfer system automatically provides improved traction and steering control upon the occurrence of instantaneous and unanticipated traction loss at the driven wheels when operating in the "on-demand" mode.

Yet another object of the present invention is to adapt the power transfer system for incorporation into four-wheel drive motor vehicles equipped with a split-shaft axle assembly interconnecting the non-driven wheels. The controller means is adapted to control actuation of an axle disconnect mechanism for automatically locking the split-shaft axle assembly when one of the part-time four-wheel drive or on-demand modes is selected by the vehicle operator to permit delivery of drive torque to the non-driven wheels. The controller also is adapted for automatically causing the axle disconnect mechanism to release the axle assembly when a two-wheel drive mode is selected.

A further object of the present invention is to supply one or more "operator-initiated" input signals to the controller means for further controlling "on-demand" operation of the power transfer system. Preferably, the operator-initiated input signals are indicative of the position of a movable control element (i.e., accelerator pedal, throttle position, steering wheel, brake pedal, etc.) and are used, in conjunction with the sensor input signals, for optimizing the amount of drive torque delivered to the non-driven wheels during operation in the "on-demand" mode.

According to a further defined embodiment, the transfer case is equipped with a speed reduction mechanism for establishing a direct-drive ("High") speed range and a reduced-ratio drive ("Low") speed range. In addition, the actuator means is operable for shifting the speed reduction mechanism between its various speed ranges in addition to controlling actuation of the clutch assembly. Thus, the vehicle operator is capable of selectively shifting the power transfer system between a two-wheel high-range drive mode (2WH), a part-time four-wheel high-range drive mode (4WH), a part-time four-wheel low-range drive mode (4WL) and the "on-demand" mode.

BRIEF DESCRIPTION OF THE DRAWINGS

Further objects, features and advantages of the present invention will become apparent from analysis of the following written specification, the accompanying drawings and the appended claims in which:

DETAILED DESCRIPTION OF THE INVENTION

In general, the present invention is directed to a power transfer system which is operably installed between the driven and non-driven wheels of a four-wheel drive vehicle and which includes means for permitting a vehicle operator to select between a two-wheel drive mode, a part-time four-wheel drive mode, and an "on-demand" drive mode. When shifted into the "on-demand" drive mode, the amount of power (i.e., drive torque) delivered to the non-driven wheels is controllably regulated in accordance with various system and driver-initiated inputs for optimizing the tractive characteristics of the vehicle while concomitantly enhancing overall steering control.

Figure 1:
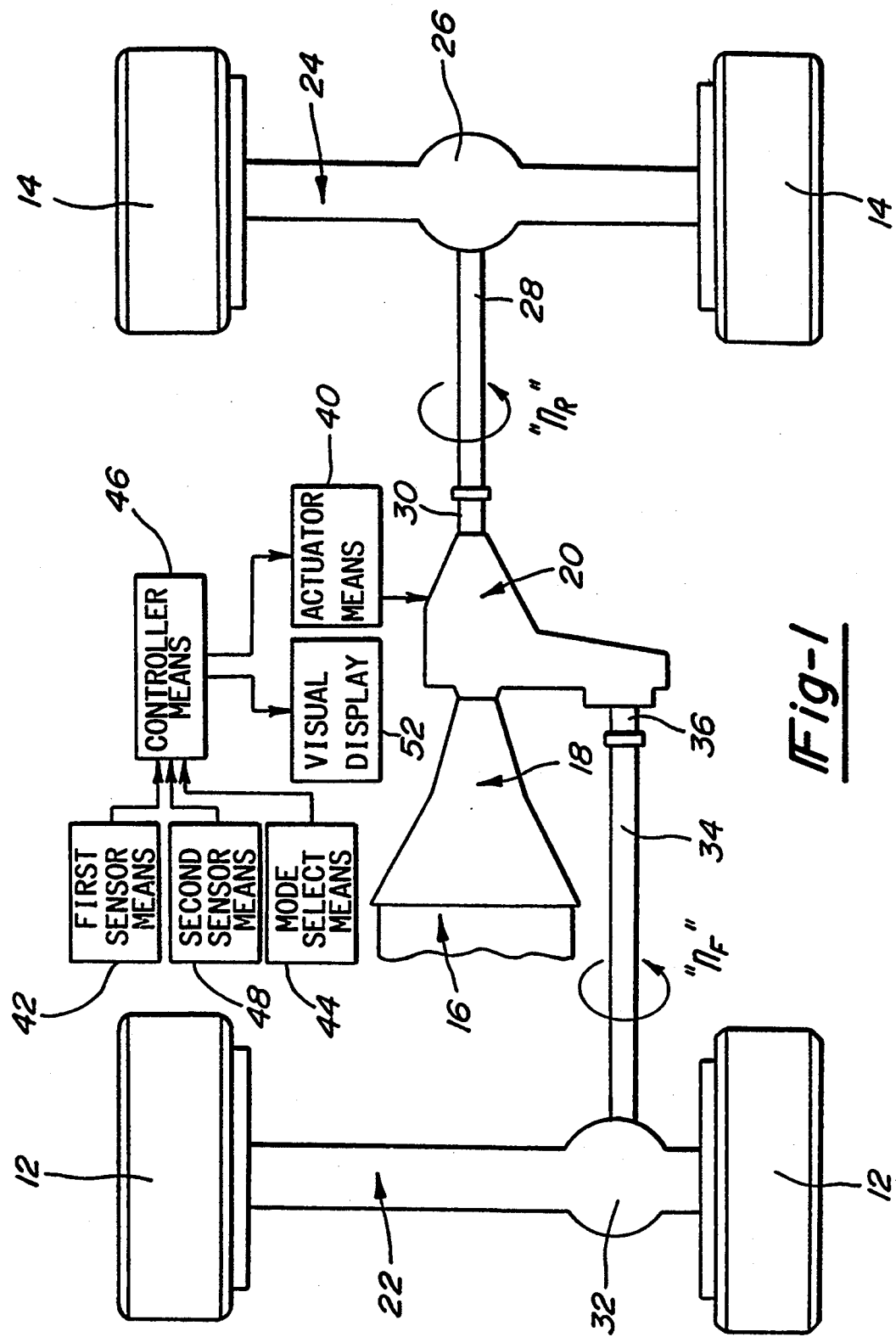
FIG. 1 is a schematic representation of an exemplary four-wheel drive vehicle having the power transfer system of the present invention incorporated therein.

Referring to FIG. 1 of the drawings, a drivetrain for a four-wheel drive vehicle is schematically shown interactively associated with a power transfer system 10 which incorporates the novel principles of the present invention. The motor vehicle drivetrain has a pair of front wheels 12 and rear wheels 14 both drivable from a source of power, such as an engine 16, through a transmission 18 which may be of either the manual or automatic type. In the particular embodiment shown, the drivetrain is a rear wheel drive system which incorporates a transfer case 20 operable to receive drive torque from engine 16 and transmission 18 for normally driving rear wheels 14 (i.e., the "driven" wheels) in the two-wheel drive mode of operation. However, it is to be understood that the specific orientation of the drivetrain is merely exemplary in nature and that the drivetrain could be reversed for normally driving front wheels 12 in the two-wheel drive mode.

Front wheels 12 and rear wheels 14 are shown connected at opposite ends of front and rear axle assemblies 22 and 24, respectively. As is known, a rear differential 26 is interconnected between rear axle assembly 24 and one end of a rear drive shaft 28, the opposite end of which is interconnected to a first output member 30 of transfer case 20. Similarly, front axle assembly 22 includes a front differential 32 that is coupled to one end of a front drive shaft 34, the opposite end of which is coupled to a second output member 36 of transfer case 20. As will be detailed hereinafter with greater specificity, transfer case 20 is equipped with an electronically-controlled torque transfer arrangement for transferring drive torque to front wheels 12 (i.e., the "non-driven" wheels) in addition to rear wheels 14 for establishing the part-time four-wheel drive mode and the "on-demand" drive mode.

According to a preferred embodiment of power transfer system 10, the torque transfer arrangement includes a transfer clutch 38 that is operable for selectively transferring drive torque from first output member 30 to second output member 36, thereby delivering drive torque to front wheels 12. Power transfer system 10 further comprises actuator means 40 for actuating transfer clutch 38, first sensor means 42 for sensing specific dynamic and operational characteristics of the motor vehicle and generating sensor input signals indicative thereof, mode select means 44 for permitting the vehicle operator to select one of the drive modes and generate a mode signal indicative thereof, and controller means 46 for generating a control signal in response to the sensor input signals and the mode signal. The controller means 46 is further operable for controlling the amount of drive torque transfer through transfer clutch 38 to second output member 36 by sending the control signal to actuator means 40. When the two-wheel drive mode is selected, all drive torque is delivered from first output member 30 to rear wheels 14 and transfer clutch 38 is maintained in a "non-actuated" condition. When the part-time four-wheel drive mode is selected, transfer clutch 38 is fully actuated into a "lock-up" condition such that second output member 36 is, in effect, rigidly coupled for driven rotation with first output member 30. Thus, in the part-time four-wheel drive mode, drive torque is distributed between front and rear wheels 12 and 14, respectively, as dictated by the tractive forces generated at each respective set of wheels. When the "on-demand" drive mode is selected, controller means 46 controls the degree of actuation of actuator means 40 for instantaneously varying the amount of drive torque directed to front wheels 12 through transfer clutch 38 as a function of the sensor input signals for providing enhanced tractive performance. In addition, the ability to controllably modulate the actuated condition of transfer clutch also provides for superior handling and steering control by substantially minimizing the oversteer and understeer tendencies of the vehicle during a cornering maneuver, such tendencies known to be commonly associated with two-wheel drive operation and part-time four-wheel drive operation, respectively. Other advantages associated with controllably modulating the actuated state of transfer clutch 38 will be detailed hereinafter.

Power transfer system 10 can additionally include second sensor means 48 for generating "operator-initiated" input signals that are indicative of the position of one or more movable control elements under the control of the vehicle operator. The operator-initiated input signals are used for establishing control characteristics which, in conjunction with the sensor input signals, further regulate the torque distribution during "on-demand" operation. Transfer case 20 can be further equipped with speed reduction means 50 for selectively transferring drive torque from engine 16 and transmission 18 to first output member 30 either directly (i.e., "high-range") or at a reduced-ratio (i.e., "low-range"). Preferably, actuator means 40 is operable for shifting speed reduction means 50 between its various speed ranges and actuating transfer clutch 38 in response to the mode signal generated by mode select means 44. Thus, the vehicle operator has the option of shifting power transfer system 10 between a two-wheel high-range drive mode, a part-time four-wheel high-range drive mode, a part-time four-wheel low-range drive mode, and the "on-demand" drive mode. As is schematically shown, controller means 46 is also operable for illuminating a visual display 52, located within the passenger compartment, for providing the vehicle operator with a visual indication of the operational status of power transfer system 10. As an additional feature, actuator means 40 may be provided with mode locking means for maintaining power transfer system 10 in the selected drive mode upon the interruption of power.

Figure 2:
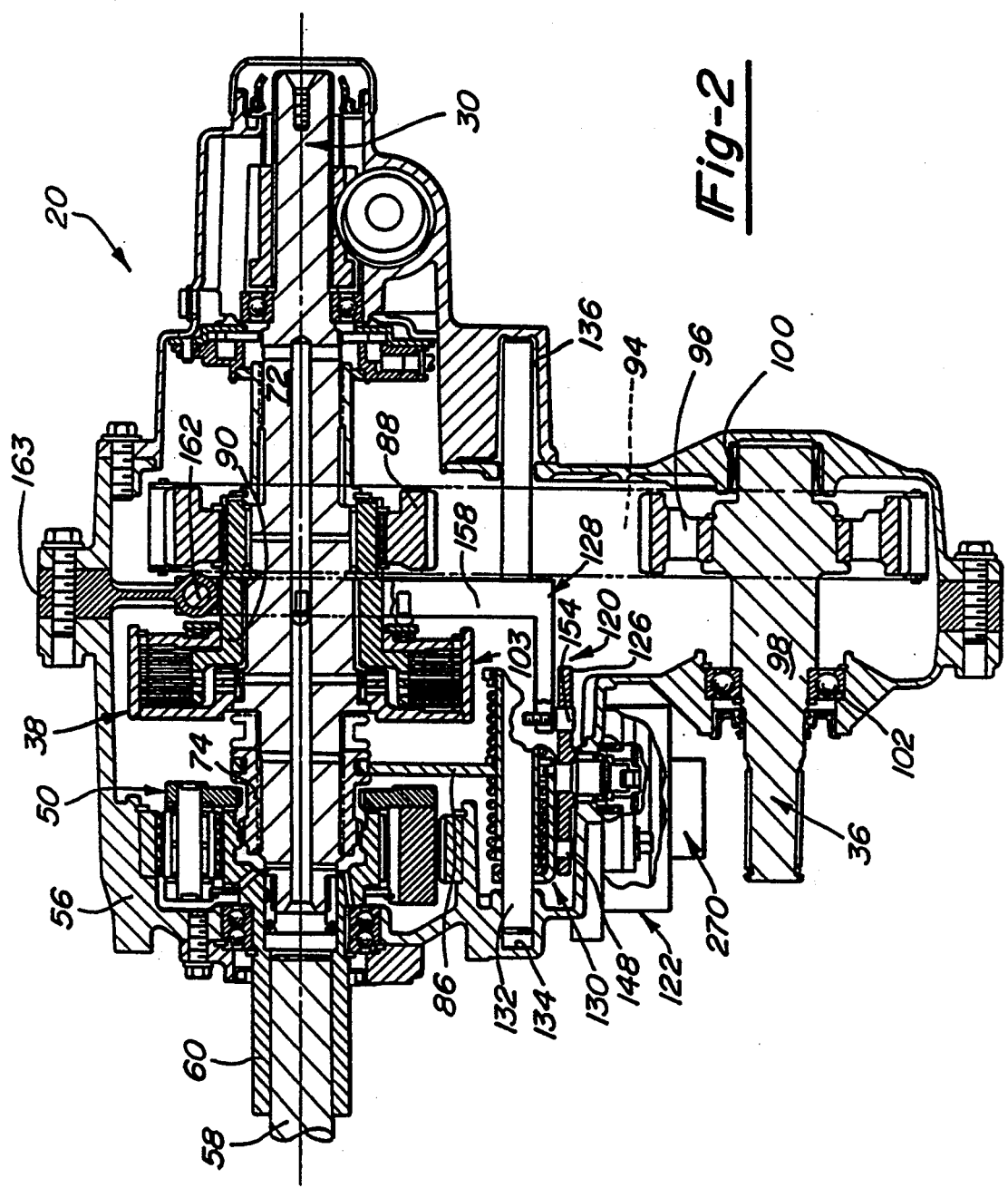
FIG. 2 is a cross-sectional view of a transfer case associated with the power transfer system and which includes a clutch assembly, a speed reduction mechanism, a drive mechanism, and an electronically-controlled actuator.
Figure 3:
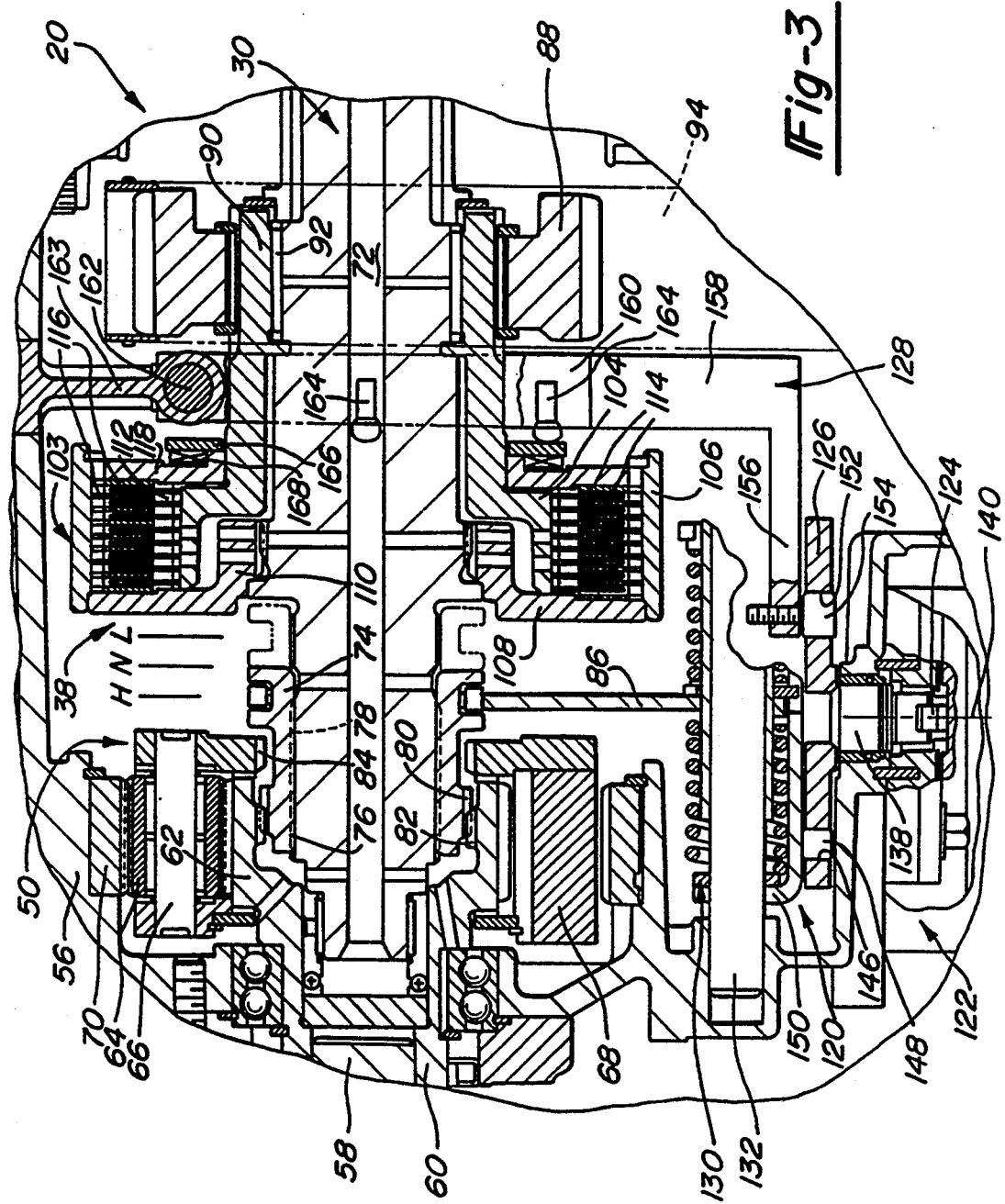
FIG. 3 is an enlarged partial view of FIG. 2 showing the various components in greater detail.

With particular reference to FIGS. 2 and 3, a preferred construction for transfer case 20 will now be described. Transfer case 20 is shown to include a housing 56 formed by a series of modular sections that are suitably interconnected in a conventional manner. A transmission output shaft 58 couples transmission 18 to an input shaft 60 of transfer case 20 for supplying power thereto. Input shaft 60 has an input sun gear 62 formed integral therewith and which is operably associated with speed reduction means 50. More specifically, sun gear 62 is meshed with a plurality of planet gears 64 (one shown), with each planet gear 64 being rotatably journalled on a pinion shaft 66 supported from a planetary carrier 68. Planet gears 64 also mesh with an annulus gear 70 which is non-rotatably mounted to an inner surface of housing 56. In operation, rotation of input shaft 60 results in planetary carrier 68 being rotatably driven at a reduced speed relative to sun gear 62. Thus, speed reduction means 50 is shown as a planetary gear assembly that is operable for establishing the high-range and low-range speed ratios. However, it will be appreciated that the planetary gear assembly is merely exemplary of one suitable speed reduction mechanism for use in transfer case 20.

According to the particular embodiment shown, first output member 30 is an elongated mainshaft 72 which is aligned on the longitudinal axis of input shaft 60 and is supported for rotation relative thereto. To provide means for selectively coupling mainshaft 72 to the output of speed reduction means 50, a range collar 74 is supported for rotation with, and axial sliding movement on, mainshaft 72 by means of collar internal splines 76 engaged with external splines 78 formed on mainshaft 72. In addition, range collar 74 is formed with external clutch teeth 80 that are shown engaged with sun gear internal clutch teeth 82. In the position shown, drive torque is transferred without reduction from input shaft 60 to mainshaft 72 via range collar 74, thereby establishing the direct-drive or "high-range" speed position, as indicated by the construction line "H". To provide means for driving mainshaft 72 at the reduced speed ratio, planetary carrier 68 includes internal clutch teeth 84 which are placed in meshed driving engagement with range collar external clutch teeth 80 upon range collar 74 being slid rearwardly for defining the "low-range" speed position, as indicated by the construction line "L". It will be noted that when range collar 74 is positioned between the high-range and low-range speed positions, its clutch teeth 80 are disengaged from both sun gear clutch teeth 82 and planetary carrier clutch teeth 84 for defining a "Neutral" position, as indicated by construction line "N". With range collar 74 in the Neutral position, no drive torque is transmitted from input shaft 60 to mainshaft 72 and, thus, no power is transmitted to the vehicle's rear wheels 14. Axial sliding movement of range collar 74 between the various speed positions is caused by axial movement of a range fork 86. As will be described, such movement of range fork 86 is controlled by actuator means 40 in response to the mode signal delivered to controller means 46 via mode select means 44.

With continued reference to FIGS. 2 and 3, means are shown for transferring drive torque from mainshaft 72 to front wheels 12 through transfer clutch 38. More specifically, a drive sprocket 88 is shown fixed for rotation on the aft end of an elongated clutch hub 90 that is associated with transfer clutch 38. Clutch hub 90 is shown rotatably supported by one or more suitable bearing assemblies 92 on mainshaft 72. Drive sprocket 88 drivingly engages a chain, shown in dashed lines at 94, which is coupled to a lower driven sprocket 96. Driven sprocket 96 is secured to, or an integral portion of, second output member 36 of part-time transfer case 20. Second output member 36 is shown as a front output shaft 98 which is supported for rotation within housing 56 by suitable bearing assemblies 100 and 102. As noted, front output shaft 98 is operably connected to the motor vehicle's from wheel 12 via front drive shaft 34.

Transfer clutch 38 is shown operably installed within transfer case 20 for transferring drive torque from mainshaft 72 to front output shaft 98. Preferably, transfer clutch 38 is a mechanically-actuated multi-plate clutch assembly that is arranged to concentrically surround a central portion of mainshaft 72 intermediate the planetary gear assembly and drive sprocket 88. As noted, elongated clutch hub 90 is fixedly secured to drive sprocket 88 so as to drive, or be driven by, front output shaft 98 of transfer case 20. In a preferred form, transfer clutch 38 includes a rotatable drum assembly 103 which concentrically surrounds a raised cylindrical section 104 formed at the forward end of clutch hub 90. Drum assembly 103 has an outer cylindrical drum 106 which is enclosed at one end by a cover plate 108. In addition, cover plate 108 has a cylindrical sleeve portion 110 that is fixed (i.e., splined) for rotation with mainshaft 72. Thus, drum assembly 103 and clutch hub 90 are capable of rotating relative to one another and form an internal chamber 112 therebetween. Disposed within internal chamber 112 are two sets of alternately interleaved friction clutch plates that are operable for transferring torque from mainshaft 72 and drum assembly 104 to clutch hub 90 and front output shaft 98 in response to a clutch "engagement" force applied thereto. One set of clutch plates, referred to as inner clutch plates 114, are mounted on raised section 106 for rotation with clutch hub 90 while the second set of clutch plates, referred to as outer clutch plates 116, are mounted for rotation with drum assembly 103. In addition, a reaction plate 118 is mounted on the aft end of cylindrical drum 106 for enclosing the interleaved clutch plates within chamber 112. Reaction plate 118 is rotatable with drum assembly 103 and yet is axially movable with respect to interleaved friction clutch plates 114 and 116. Thus, reaction plate 118 acts as a pressure plate for compressing the interleaved clutch plates so as to cause drive torque to be transferred through transfer clutch 38 as a function of the clutch engagement force exerted thereon by actuator means 40.

To provide means for selectively moving range collar 74 between its various speed range positions and for controlling the magnitude of the clutch engagement force exerted on reaction plate 118, actuator means 40 comprises a mechanical drive mechanism 120 and an electrically-controlled actuator 122. In general, actuator 122 is a rotary-driven actuator, such as an electric gearmotor, which is operable for generating an output torque, the value of which varies as a function of the magnitude of the electrical control signal applied thereto by controller means 46. More specifically, drive mechanism 120 is interconnected to a rotary output member 124 of actuator 122 for changing the output torque into an axially-directed force for controlling axial movement of range collar 74 and the engagement force applied to reaction plate 118 of transfer clutch 38. As best seen from FIGS. 3 and 4, drive mechanism 120 includes a sector plate 126 that is rotatably driven through a limited range of angular motion by output member 124 of actuator 122. Sector plate 126 is interconnected to a lever arm assembly 128 for exerting the clutch engagement force on reaction plate 118 in response to controlled rotation of sector plate 126. In addition, sector plate 126 is also interconnected to a shift fork assembly 130 for concurrently controlling the axial position of range fork 86 and, in turn, range collar 74 in response to such controlled rotation of sector plate 126. Shift fork assembly 130 is a spring-loaded mechanism supported for movement on a shift rail 132 and which is substantially similar to that described in commonly owned U.S. Pat. No. 4,529,080 to Dolan, the disclosure of which is expressly incorporated by reference herein. From FIG. 2, shift rail 132 is shown to have its opposite ends disposed in fore and aft sockets 134 and 136, respectively, formed in housing 56.

A rotatable actuating shaft 138 is supported from transfer case housing 56 for rotation about an axis 140. A first end of actuating shaft 138 is secured in an aperture 142 formed in sector plate 126, with its opposite end coupled to output member 124 of electrically-controlled actuator 122. Thus, actuating shaft 138 and sector plate 126 are rotated about axis 140 in response to the output torque generated by actuator 122. From FIG. 4 it can be seen that sector plate 126 may be rotated about axis 140 by actuator shaft 138 to any of five distinct sector positions, as labelled "4WH", "2WH", "N", "2WL" and "4WL". To control movement of range collar 74, sector plate 126 has an elongated range slot 146 formed therein into which a range pin 148 extends. From FIG. 3, it can be seen that range pin 148 is fixed to a U-shaped bracket 150 of shift fork assembly 130 which is retained for sliding movement on shift rail 132. Range slot 146 is configured to cause the desired translational movement of bracket 150, range fork 86 and range collar 74 in response to controlled bi-directional rotation of sector plate 126.

To control the engagement force exerted on reaction plate 118, sector plate 126 further includes an elongated mode slot 152 into which a crowned roller 154 extends. Crowned roller 154 is fixed to a flange section 156 of a lever member 158 associated with lever arm assembly 128. Lever member 158 also includes a generally Y-shaped or forked section 160 which is bifurcated to surround mainshaft 72 and clutch hub 90. The bifurcated ends of forked section 160 are retained for pivotal movement on a transverse rail 162, the ends of which are retained in suitable sockets (not shown) formed in an intermediate spacer plate 163 fixed to housing 56. In general, the contour of mode slot 152 is configured to control the pivotable movement of lever member 158 in response to rotation of sector plate 126 for controlling the magnitude of the clutch engagement force exerted on reaction plate 118 of transfer clutch 38. Moreover, a plurality of circumferentially-spaced buttons 164 are secured to a front surface of forked section 160 and are adapted to apply the clutch engagement force to reaction plate 118 for compressing the interleaved clutch plates 114 and 116 via a suitable thrust mechanism. Preferably, the thrust mechanism includes an annular apply plate 166 positioned intermediate reaction plate 118 and lever member 158, and a thrust bearing/washer arrangement 168 interposed between apply plate 166 and reaction plate 118 for allowing rotation of reaction plate 118 with respect to apply plate 166.

In view of incorporation of speed reduction means 50 into transfer case 20, power transfer system 10 is operable for establishing five distinct operative modes, namely the two-wheel high-range drive mode, the part-time four-wheel high-range drive mode, the part-time four-wheel low-range drive mode, the "on-demand" drive mode and the Neutral mode. As described, the particular operational mode selected is established by the position of crowned roller 154 in mode slot 152 and the position of range pin 148 in range slot 146 in response to the angular position of sector plate 126. In operation, the vehicle operator selects the desired operative mode via mode select means 44 which, in turn, signals controller means 46 of the selection. Thereafter, controller means 46 generates an electrical control signal that is applied to actuator 122 for controlling the rotated position of sector plate 126. Moreover, for each of the 2WH, 4WH, N and 4WL operative drive modes, sector plate 126 is controllably rotated to the predefined sector position. However, when the "on-demand" drive mode is selected, power transfer system 10 is operable for modulating the clutch engagement force applied to transfer clutch 38 as a function of various system and operator initiated inputs.

Figure 4:
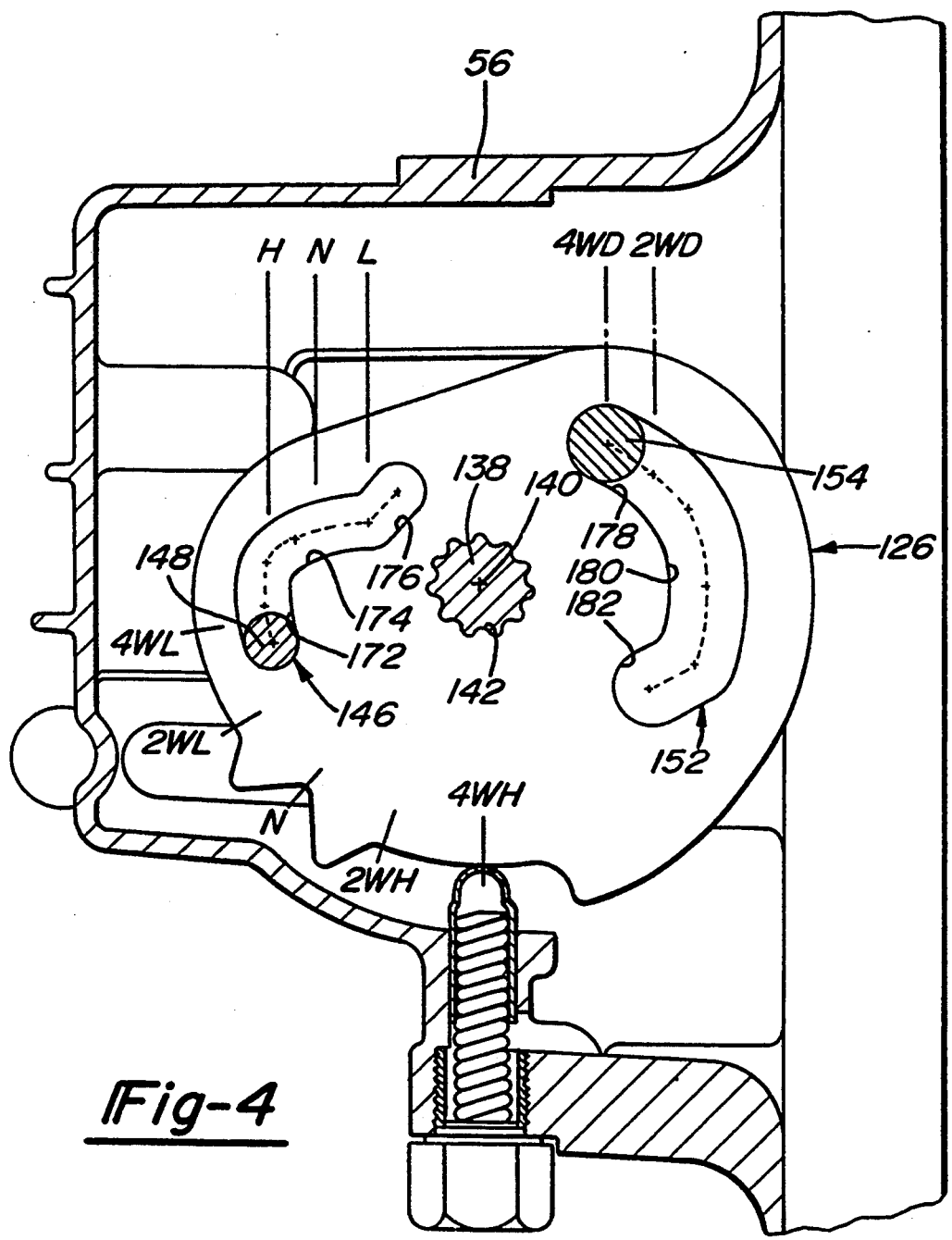
FIG. 4 is a side view of a sector plate that is rotatably driven by the actuator for actuating the clutch assembly and speed reduction mechanism.

With particular reference now to FIG. 4, means are provided for coordinating the axial movement of shift fork assembly 130 and the pivotal movement of lever arm assembly 128 upon rotation of sector plate 126 between the various sector positions for establishing the desired combination of drive modes and speed ranges. In general, the contour of range slot 146 is defined by first, second and third cam pathways 172, 174 and 176, respectively, which respectively correspond to fourth, fifth and sixth cam pathways 178, 180 and 182, respectively, associated with mode slot 152. In the sector position shown, crowned roller 154 is positioned within mode slot 152 in close proximity to the terminal end of fourth cam pathway 178 for establishing a four-wheel drive (4WD) position. With crowned roller 154 in the four-wheel drive (4WD) position, lever arm assembly 128 exerts a maximum clutch engagement force on reaction plate 118 such that transfer clutch 38 is considered to be operating in a fully "actuated" or "locked-up" condition. As such, drive torque is transferred from mainshaft 72 and drum assembly 103 through the interleaved clutch plates to clutch hub 90 and, in turn, to front output shaft 98. In addition, range pin 148 is shown positioned within range slot 146 in close proximity to the terminal end of first cam pathways 172 for positioning range collar 74 in the high-range ("H") speed position. Accordingly, when mode select means 44 signals that the vehicle operator has selected the part-time four-wheel high-range drive mode, controller means 46 send a control signal to actuator 122 for generating sufficient output torque to rotate sector plate 126 to the 4WH sector position shown.

As sector plate 126 is caused to rotate about axis 140 in a first (i.e., counterclockwise) direction from the position shown, the contour of fourth cam pathway 178 causes axial displacement of crowned roller 154 toward a two-wheel drive (2WD) position. Such movement of crowned roller 154 causes concurrent pivotable movement of lever arm assembly 128 which results in a proportional decrease in the clutch engagement force being exerted on reaction plate 118. Moreover, once crowned roller 154 is in the two-wheel drive (2WD) position, lever arm assembly 128 does not exert an engagement force on reaction plate 118 which is sufficient to transfer drive torque through transfer clutch 38, whereby transfer clutch 38 is considered to be in a "non-actuated" condition. Concurrent with such movement of crowned roller 154 in mode slot 152 toward the two-wheel drive (2WD) position, range pin 148 is guided within first cam pathway 172 of range slot 146 for maintaining range collar 74 in the high-range (H) speed position. As such, when mode select means 44 signals that the vehicle operator has selected the two-wheel high-range drive mode, controller means 46 sends a control signal to actuator 122 for causing sector plate to rotate to the 2WH sector position. As will be hereinafter detailed, when the "on-demand" mode is selected, actuator 122 is actuated in accordance with specific predefined relationships established in response to the current value of the sensor input signals for rotatably driving sector plate 126 to any position between the 2WH and 4WH sector positions. Thus, the amount of torque transferred to front output shaft 98 through transfer clutch 38 is proportional to the clutch engagement force, the value of which is determined by the particular position of crowned roller 154 between the two-wheel drive (2WD) position and the four-wheel drive (4WD) position that is established upon controlled rotation of sector plate 126.

Power transfer system 10 is also operable to permit transfer case 20 to be shifted into a "Neutral" mode and the part-time four-wheel low-range drive mode. More particularly, upon mode select means 44 signalling selection of either mode, actuator 122 is actuated for causing sector plate 126 to rotate in the first direction for concurrently guiding crowned roller 154 within fifth cam pathway 180 of mode slot 152 and range pin 148 within second cam pathway 174 of range slot 146. The contour of fifth cam pathway 180 is designed to retain crowned roller 154 in the two-wheel drive (2WD) position, whereby transfer clutch 38 is maintained in the non-actuated condition. However, range pin 148 is axially displaced due to the contour of second cam pathway 174 for sequentially shifting range collar 74 from the high-range (H) speed position into the Neutral (N) speed position or the low-range (L) speed position.

Thus, during "range" shifting of range collar 74, sector plate 126 is configured to maintain transfer clutch 38 in its non-actuated condition to eliminate the possibility of over-loading transfer clutch 38. Moreover, when the part-time four-wheel low-range drive mode is selected, sector plate 126 is rotated in the first direction through the N sector position and the 2WL sector position prior to entering into the 4WL sector position. Upon such movement, crowned roller 154 is guided in sixth cam pathway 182 of mode slot 152 for movement from the two-wheel drive (2WD) position into the four-wheel drive (4WD) position while range pin 148 is guided within third cam pathway 176 to maintain range collar 74 in the low-range (L) speed position, thereby establishing the part-time four-wheel low-range drive mode. Thus, while not typically required, transfer case 20 is also capable of providing a two-wheel low-range drive mode if desired.

In its most basic sense, the "on-demand" mode is provided for automatically and instantaneously transferring drive torque to front wheels 12 during the occurrence of slippage of rear wheels 14 that are typically associated with low tractive road conditions. Once the "on-demand" mode is selected, power transfer system 10 functions to continuously monitor and regulate the "on-demand" operation in a manner that is independent of any deliberate action by the vehicle operator. As noted, the actuated condition of transfer clutch 38 is modulated while speed reduction means 50 is operating in its high-range speed for controlling the output of transfer clutch 38 between the limits defined by the two-wheel high-range and part-time four-wheel high-range drive modes. Accordingly, the modulation range is established between the limits of bi-directional sector rotation defined by movement of crowned roller 154 within fourth cam pathway 178 between the (2WD) and (4WD) positions while range pin 148 is guided within first cam pathway 172. According to the embodiment disclosed, the magnitude of the engagement force generated by lever arm assembly 128 and applied to transfer clutch 38 is proportional to the magnitude of the output torque generated by actuator 122 which, in turn, is proportional to the magnitude of the electrical control signal (i.e., percentage duty cycle) applied to actuator 122. Thus, the amount of drive torque transferred through transfer clutch 38 to front output shaft 98 is also proportional to the magnitude of the control signal. As such, the distribution ratio of drive torque between front output shaft 98 and mainshaft 72 of transfer case 20 may be selectively varied as a function of changes in the magnitude of the control signal for optimizing the tractive performance characteristics associated with operation in the "on-demand" drive mode.

Figure 5:
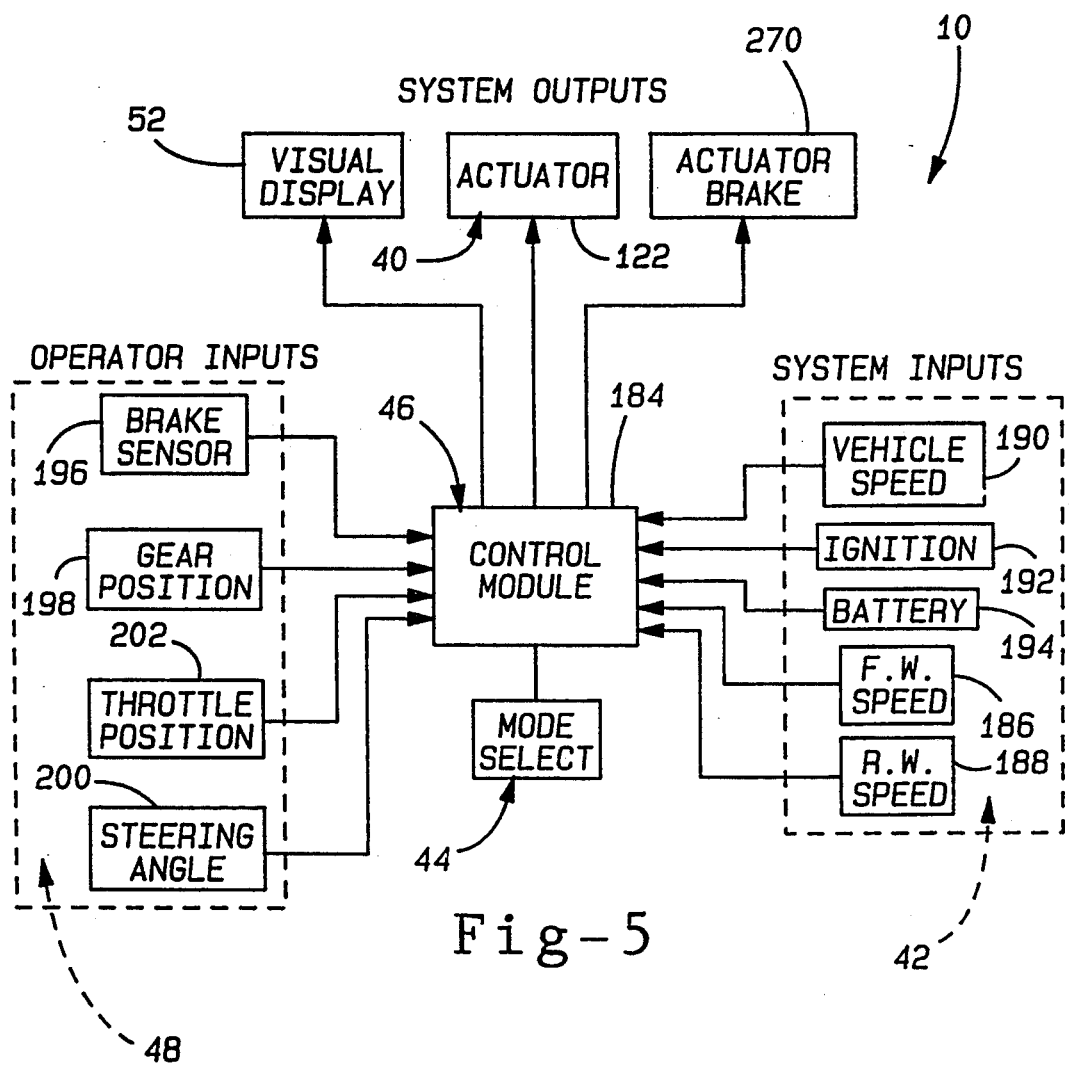
FIG. 5 is a block diagram of the control system for a preferred embodiment of the present invention.

With particular reference now to FIG. 5, a block diagram of a control system associated with power transfer system 10 is shown. Preferably, controller means 46 is an electronic control module 184 having signal processing and information storage capabilities. In addition, first sensor means 42 is shown as a group of various "system" sensors that are provided for detecting and signaling specific dynamic and operational characteristics of the motor vehicle. The input signals generated by the "systems" sensor group are delivered to electronic control module 184. Preferably, these sensors include a front speed sensor 186 for sensing the rotational speed ($n_F$) of front drive shaft 34, a rear speed sensor 188 for sensing the rotational speed ($n_R$) of rear drive shaft 28, a vehicle speed sensor 190 for sensing a vehicle speed (V), an ignition switch 192 for signalling the operational status of the vehicle, and a battery input 194 for powering electronic control module 184. In vehicles equipped with an anti-lock brake system (ABS), the original equipment ABS sensors provided at each wheel can be used for determining an "average" front drive shaft speed and rear drive shaft speed. Alternatively, front and rear speed sensors 186 and 188, respectively, can be arranged for directly measuring the speed of front output shaft 98 and mainshaft 72, respectively. Moreover, it is possible for vehicle speed sensor 190 to be eliminated with the vehicle speed signal (V) being computed from the front rotational speed signal ($n_F$) generated by front speed sensor 186. However, it is to be understood that any suitable speed sensing arrangement capable of generating a signal indicative of the rotational speed of a shaft is fairly within the scope of the present invention.

The control system also utilizes various "operator-initiated" inputs, as generally categorized by second sensor means 48. These inputs include a brake sensor 196 for sensing when the vehicle operator is applying the brakes, a gear position sensor 198 for sensing a gear position of transmission 18, a steering angle sensor 200 for detecting the magnitude of a steering angle ($\Phi$), and an accelerator sensor for sensing an accelerating condition of the vehicle. Preferably, the accelerator sensor is a throttle position sensor 202 for sensing the degree of opening of a throttle valve associated with engine 16 or for sensing the degree of depression of an accelerator pedal, and is operable to produce a throttle position signal (A). The operator-initiated input signals are delivered to control module 184 where they are used, in conjunction with the system input signals, to further control "on-demand" operation.

To provide means for the vehicle operator to shift power transfer system 10 into one of the available operational modes, mode select means 44 can take the form of any mode selector device which is under the control of the vehicle operator for generating a mode signal indicative of the specific mode selected. In one form, the mode selector device may be an array of dash-mounted push button switches. Alternatively, the mode selector device may be a manually-operable shift lever sequentially movable between a plurality of positions corresponding to the available operational modes which, in conjunction with a suitable electrical switch arrangement, generates a mode signal indicating the mode selected. In either form, mode select means 44 offers the vehicle operator the option of deliberately choosing between the various operative drive modes.

Figure 6:
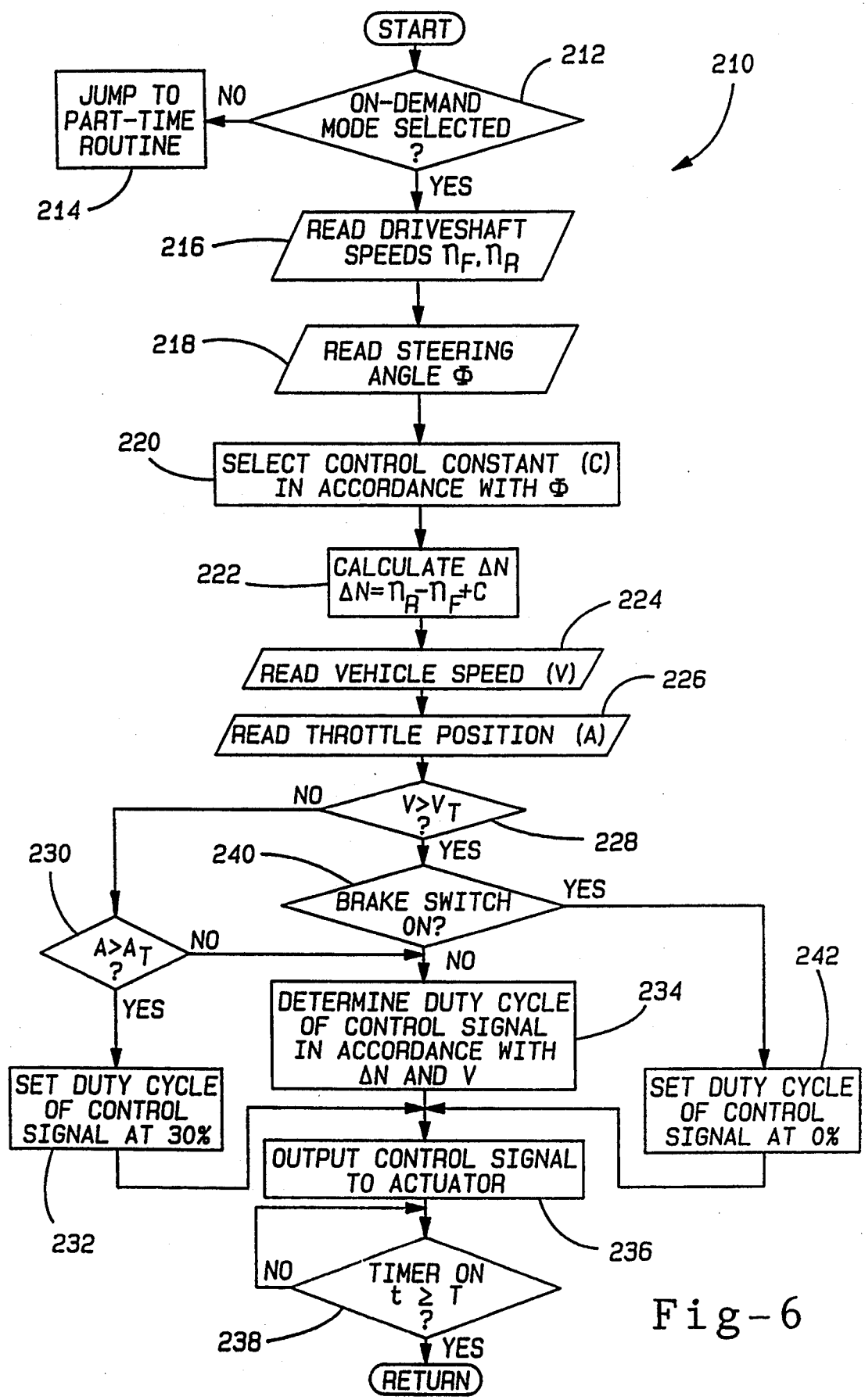
FIGS. 6 and 7 are flow charts depicting a control sequence for the operations performed by the control system of FIG. 5.
Figure 9:
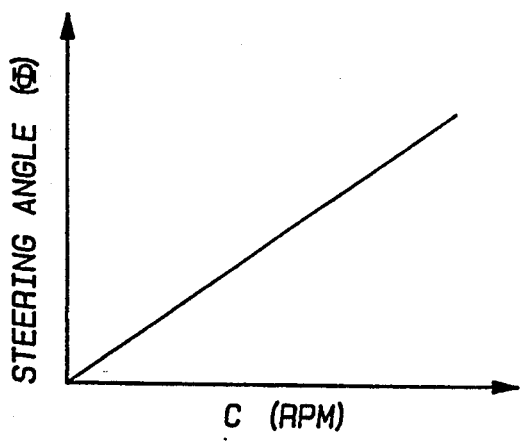
FIG. 9 is an exemplary plot of a relationship between steering angle and a control characteristic used for modifying the speed differential signal.

With reference now to FIG. 6, a control sequence for the selection and the subsequent automatic control of the "on-demand" drive mode is shown in a flow chart 210. In general, flow chart 210 represents a sequence of operations performed by electronic control module 184 which are diagrammatically shown in block form. When mode select means 44 signals selection of the "on-demand" mode, as indicated by block 212, a succession of control steps are repeated for selecting the value of the control signal to be applied to electric actuator 122. In the preferred form, the control signal is selected in accordance with various predefined relationships between the current value of a front and rear wheel speed differential ($\Delta N$) and vehicle speed (V), as modified by current value of the steering angle ($\Phi$) and other operator-initiated inputs. However, if any other mode is selected, then the control sequence jumps to a part-time routine, as indicated by block 214 and which is set forth in greater detail in FIG. 7. Block 216 is representative of the control step in which the current value of the rotational speed of front drive shaft 34 ($n_F$) and rear drive shaft 28 ($n_R$) are read. Block 218 indicates the step of reading the value of steering angle ($\Phi$) as detected by steering angle sensor 200. Block 220 represents the operation of selecting a control characteristic (C) in accordance with the steering angle ($\Phi$). FIG. 9 illustrates a plot of an exemplary relationship, which may be stored as a look-up table or computed from an arithmetic equation in control module 184, which correlates the control characteristic (C) as a linear function of the detected steering angle ($\Phi$). Next, block 222 represents the step of calculating the value of a speed differential ($\Delta N$) according to the equation $$\Delta N = n_R - n_F + C$$

Blocks 224 and 226 indicate the steps of reading the current value of the vehicle speed (V) as detected by vehicle speed sensor 190 and the throttle position (A) as detected by throttle position sensor 202, respectively. As shown in block 228, control mode 184 determines whether the vehicle speed (V) exceeds a predefined threshold value ($V_T$) such as, for example, 5 mph. If the vehicle speed is less than the threshold value ($V_T$), a second determination is made (block 230) as to whether the value of the throttle position (A) exceeds a predefined threshold value ($A_T$) such as, for example, a 50% accelerator pedal depression angle. If the vehicle speed (V) is less than its threshold value ($V_T$) and the throttle position (A) exceeds its threshold value ($A_T$), then the magnitude (i.e., percentage of duty cycle) of the electrical control signal is set as a preset value, such as 30% duty cycle, as indicated by block 232. In this manner, power transfer system 10 is adapted to transfer torque to front wheels 12 in response to quick acceleration at low vehicle speeds to inhibit wheel slip. However, if the value of the throttle position (A) is less than its threshold value ($A_T$), then the magnitude of the duty cycle for the control signal is set in accordance with predefined relationships between the speed differential ($\Delta N$) and vehicle speed (V), as indicated by block 234. Block 236 represents the step of outputting the electrical control signal to actuator 122 for developing the desired amount of torque transfer, if any, across transfer clutch 38. As shown in block 238, a timer circuit within control module 184 is actuated simultaneously with energization of actuator 122 for maintaining such energization for a predetermined time period (T). Once the period of energization (t) equals the predetermined time period (T) (or $t \geq T$), control module 184 repeats the control routine.

To enhance steering control, block 240 is indicative of the control step between steps 228 and 234 for determining whether the vehicle operator is applying the brakes when the vehicle speed (V) is greater than the threshold value ($V_T$). Accordingly, if the vehicle operator is attempting to stop the vehicle, by applying the brakes (as sensed by brake sensor 196) during an occurrence of a low traction road condition and the vehicle speed (V) is greater than the predefined threshold ($V_T$), then control module 184 sets the magnitude of the control signal sent to actuator 122 to zero (block 242) for de-actuating transfer clutch 38 and disabling the "on-demand" drive feature. This control sequence prevents simultaneous braking and "on-demand" four-wheel drive operation for providing the vehicle operator with greater steering and braking control. However, during the occurrence of a low traction condition when brake sensor 196 signals control module 184 that the vehicle operator is not applying the brakes, electronic control module 184 automatically energizes actuator 122 (block 236) for actuating transfer clutch 38 in accordance with the relationships generally denoted by block 234.

Figure 8:
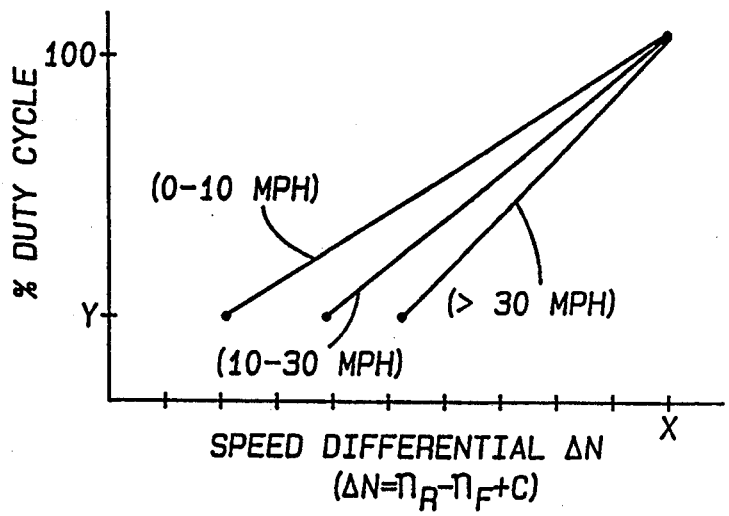
FIG. 8 illustrates exemplary plots of relationships between wheel speed differential signals at various vehicle speed ranges and the electrical control signal supplied by the control system to the actuator for controlling the amount of torque transferred through the clutch assembly during "on-demand" operation.

With particular reference to FIG. 8, a set of exemplary plots used for establishing the magnitude of the duty cycle in response to the current value of the speed differential ($\Delta N$) and the vehicle speed (V) during "on-demand" operation, as diagrammatically referred to by block 234 in FIG. 6, will now be detailed. As seen, power transfer system 10 is programmed to linearly correlate the percentage duty cycle of the electrical control signal to a range of speed differential ($\Delta N$) values. In general, the percentage duty cycle for the control signal increases linearly from a minimum actuation value (Y %) to a maximum actuation value (100%) as the value of the speed differential ($\Delta N$), within a particular vehicle speed range, increases from a minimum speed differential limit to a maximum speed differential limit (X). As such, when the value of the speed differential ($\Delta N$) is less than the minimum speed differential limit, no drive torque is transferred through transfer clutch 38 to front output shaft 98 and the vehicle operates in an otherwise normal two-wheel drive mode of operation. However, when the value of the speed differential ($\Delta N$) exceeds the minimum differential limit, "on-demand" four-wheel drive operation is established by supplying a control signal to actuator 122 having a duty cycle value greater than (Y %). Thus, the minimum actuation duty cycle (Y %) for the control signal correlates to the point at which sufficient frictional engagement between interleaved clutch plates 114 and 116 results in the delivery of a portion of the total drive torque to front output shaft 98 of transfer case 20 for initiating four-wheel drive operation in the "on-demand" mode.

Figure 10:
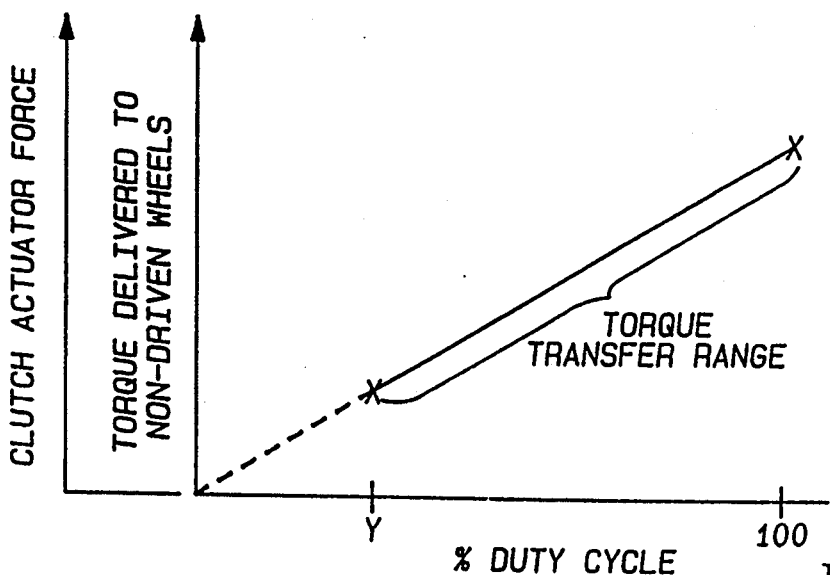
FIG. 10 graphically illustrates the relationship of the electrical control signal with respect to the output force generated by the drive mechanism and the corresponding drive torque transferred through the clutch assembly to the non-driven wheels.

Preferably, the portion of the total drive torque transferred through transfer clutch 38 to front output shaft 98 increases substantially linearly as the magnitude of the duty cycle for the control signal increases from the minimum actuation value (Y %) to the maximum actuation value (100%). Preferably, the maximum value (X) of the speed differential ($\Delta N$) correlates to the maximum actuation duty cycle (100%) at which point the maximum clutch engagement force is generated for completely locking-up clutch plates 114 and 116. During "on-demand" operation, a reduction in the magnitude of the control signal sent to actuator 122 will result in actuator output member 124 being back-driven due to the clutch engagement load exerted by lever arm assembly 128 on sector plate 126. As such, a zero control signal will back-drive sector plate 126 to the two-wheel high-range (2WH) sector position. Alternatively, the direction of driven rotation of actuator output member 124 may be reversed for rotating sector 126 therewith until the desired clutch engagement force is established. As best seen from FIG. 10, an exemplary linear relationship between the magnitude of the duty cycle supplied to actuator 122 and the clutch engagement force generated and, in turn, the amount of torque delivered across transfer clutch 38 is shown.

Figure 7:
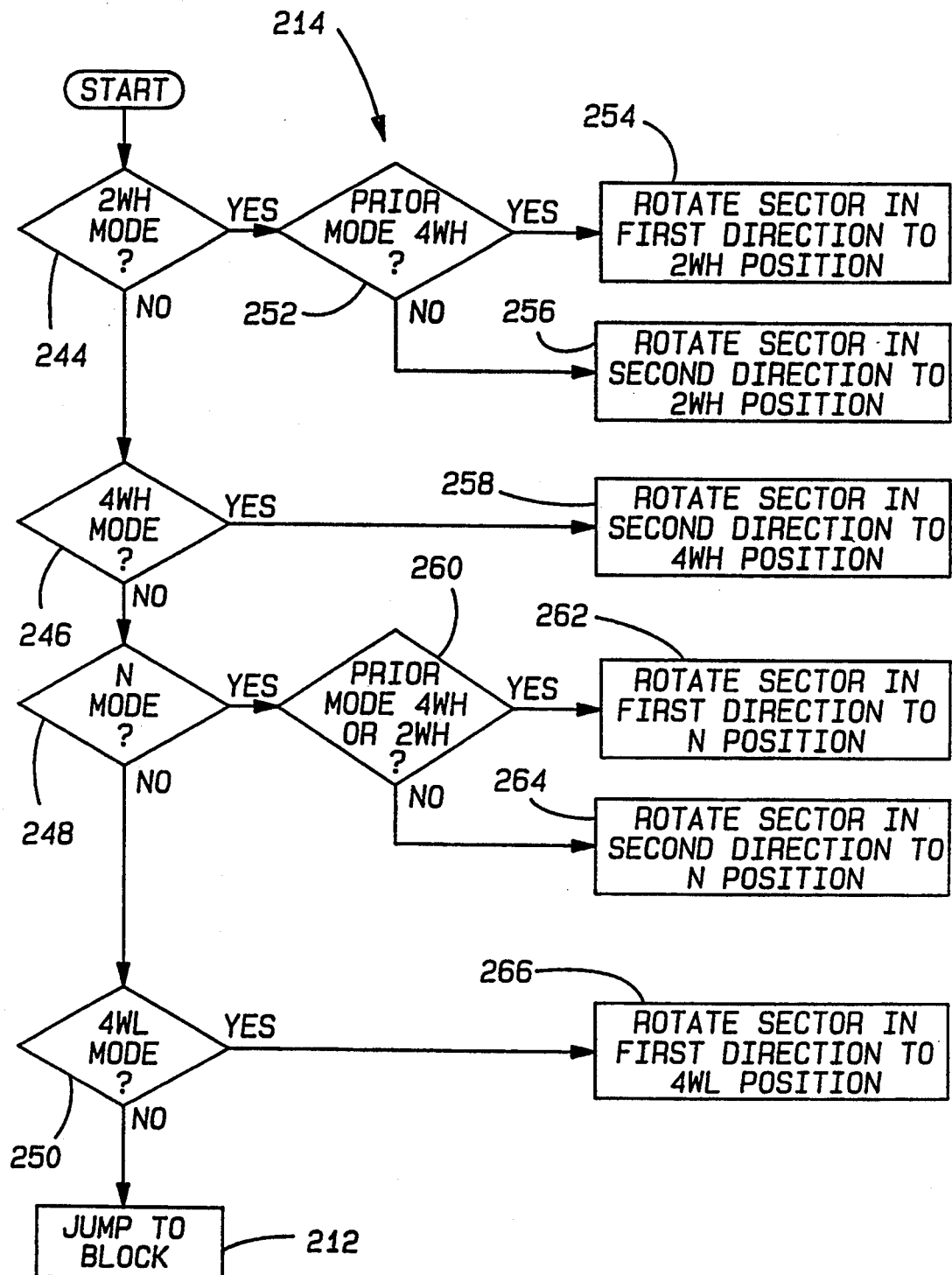

When the vehicle operator selects an operational mode via mode select means 44 other than the "on-demand" mode, control module 184 is adapted to supply a control signal to actuator 122 for causing sector plate 126 to rotate to the particular sector position corresponding to the selected drive mode. FIG. 7 illustrates a flow chart representing an exemplary sequence of operations preformed by control module 184, and herebefore referred to as part-time routine 214. In particular, blocks 244, 246, 248 and 250 represent the sequential steps of determining which of the two-wheel high-range drive mode (2WH), the part-time four-wheel high-range drive mode (4WH), the Neutral mode or the part-time four-wheel low-range (4WL) drive mode, respectively, was selected, as signalled by mode select means 44. If the two-wheel high-range drive mode (2WH) was selected, block 252 indicates the step of determining whether the prior mode was the part-time four-wheel high-range drive mode (4WH). If yes, block 254 represents the step of control module 184 sending a control signal to actuator 122 for rotating sector plate 126 in the first direction to its 2WH sector position. If no, block 256 indicates the operation of rotating sector plate 126 in the second direction to its 2WH sector position.

If block 246 indicates that the part-time four-wheel high-range drive mode (4WH) was selected, then control module 184 sends the maximal value of the control signal to actuator 122 for causing sector plate 126 to rotate in the second direction to its 4WH sector position, as indicated by block 258. As noted, when the part-time four-wheel drive mode is selected, transfer clutch 38 is fully actuated into a maximum torque transfer "lock-up" condition. If block 248 indicates that the Neutral mode (N) was selected, step 260 determines if the prior mode was either of the two-wheel high-range drive mode (2WH) or part-time four-wheel high-range drive mode (4WH). If yes, block 262 indicates the step of controllably actuating actuator 122 for rotating sector plate 126 in the first direction to its N sector position. If no, block 264 indicates the step of actuating actuator 122 to rotate sector plate 126 in the second direction to its N sector position. Finally, if the part-time four-wheel low-range drive mode (4WL) is selected (block 250), then actuator 122 is actuated for rotating sector plate 126 in the first direction to its 4WL sector position, as indicated by block 266. As is common to most part-time systems, it is contemplated that power transfer system 10 will inhibit completion of the shift into either of the Neutral mode or the part-time four-wheel low-range mode unless the vehicle speed (V) is less than the threshold value (V$_T$) and transmission 18 is in a Neutral gear position, as indicated by gear position sensor 198.

It is contemplated that the present invention can also incorporate means for maintaining the selected mode upon power interruption to actuator 122. To this end, a brake 270, schematically shown in FIGS. 2 and 5, is provided. Brake 270 is an electrically-controlled spring-applied device that is operable in a "power-off" condition for braking inertial loads (i.e., rotation) exerted on output member 124 of actuator 122 and, in turn, actuation shaft 138. During normal operation of the vehicle, control module 184 delivers an electrical signal to brake 270 to maintain it in a released or "power-on" condition. Moreover, during controlled rotation of sector 126, brake 270 is maintained in its released "power-on" condition. However, upon interruption of power to brake 270, brake torque is generated for inhibiting rotation of shaft 138. Thus, once sector plate 126 has been rotated into one of its part-time four-wheel drive sector positions, power to brake 270 can be interrupted for positively retaining sector plate 126 in the rotated position. Thereafter, power to actuator 122 can be interrupted to minimize its on-time service requirements.

Figure 11:
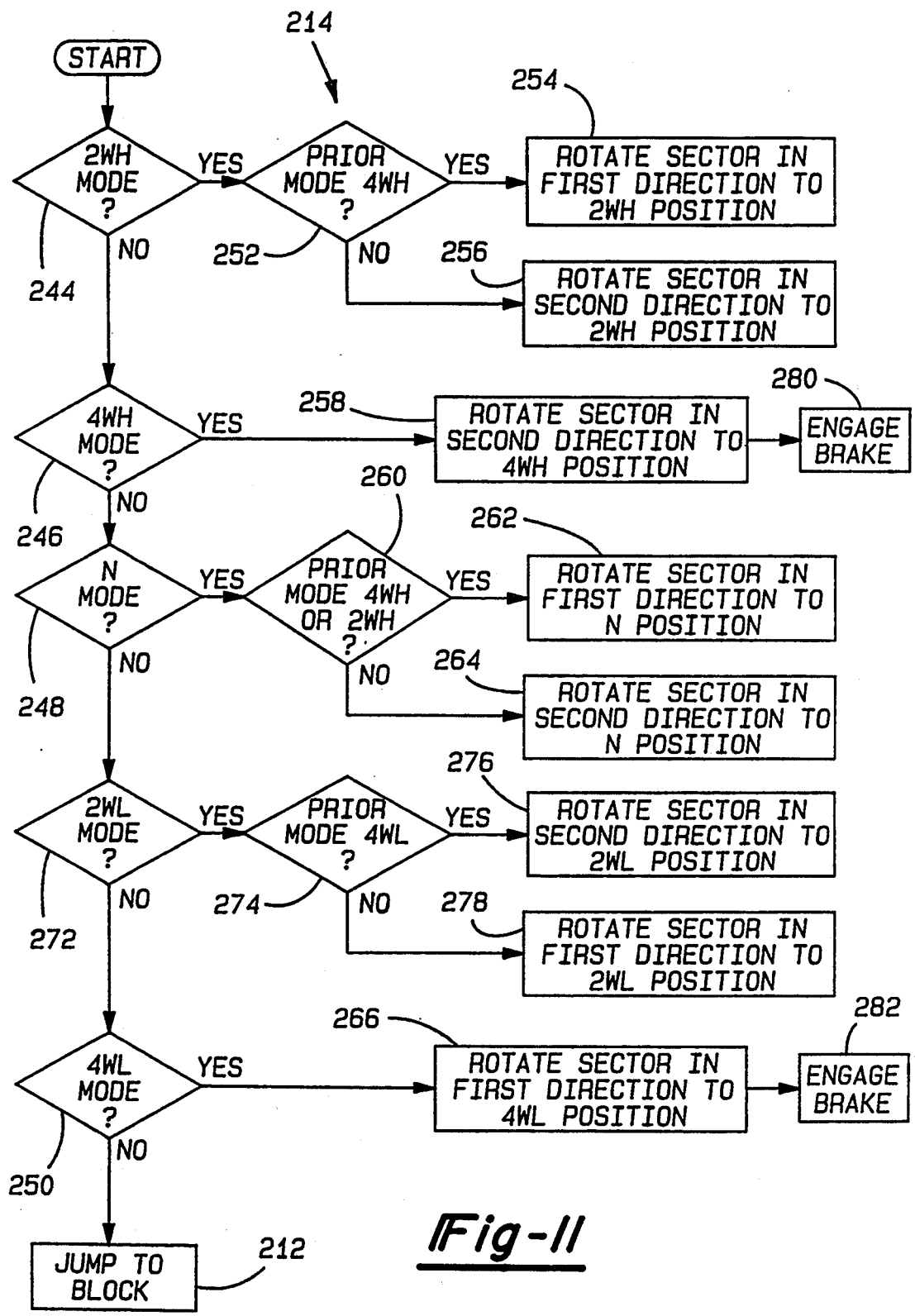
FIG. 11 is a flow chart, similar to FIG. 7, depicting a modified control sequence associated with the power transfer system for providing a two-wheel low-range drive mode.

As previously noted, power transfer system 10 is also capable of permitting the vehicle operator to select a two-wheel low-range drive mode. In general, FIG. 11 is a modified version of the flow chart shown in FIG. 7 which illustrates the additional control steps associated with incorporating such a two-wheel low-range drive mode (2WL) into the control system for transfer case 20. More specifically, part-time routine 214 is now shown to include an additional sub-routine which has been inserted into the sequential steps previously disclosed. Thus, if block 272 represents a mode signal sent to control module 184 indicating that the two-wheel low-range drive mode (2WL) has been selected, then block 274 indicates the step of determining whether or not the prior mode was the part-time four-wheel low-range drive mode (4WL). If yes, block 276 represents the step of sending a control signal to actuator 122 for rotating sector plate 126 in the second direction to its 2WL sector position. If no, block 278 indicates the operation of actuator 122 rotating sector plate 126 in the first direction to its 2WL sector position. As is also apparent, blocks 280 and 282 have been added to flow chart 214 to represent the control step of interrupting power to clutch brake 270 for retaining sector plate 126 in one of its part-time four-wheel drive positions.

In view of the above-noted provisions associated with transfer case 20 for optionally providing a two-wheel low-range drive mode, it will be apparent to those skilled in the art that a "Low-range" on-demand drive mode is likewise available, if so desired. Thus, in addition to, or instead of, modulating the position of sector plate 126 between its 2WH and 4WH sector positions for establishing the above-described "High-range" on-demand drive mode, power transfer system 10 can be adapted to provide a "Low-range" on-demand drive mode with its modulated torque transfer limits established by the angular position of sector plate 126 between its 2WL and 4WL sector positions. Accordingly, the "Low-range" on-demand modulation range is established by bi-directional movement of crowned roller 154 within sixth cam pathway 182 of mode slot 152 between the (2WD) and (4WD) positions while range pin 148 is guided within third cam pathway 176 of range slot 146 to maintain range collar 74 in the low-range (L) speed position. While not expressly detailed, it will likewise be understood that a control system and characteristic functions similar to those set forth in FIGS. 5 through 10 for controlling the "High-range" on-demand drive mode can also be used or suitably modified so as to control the "Low-range" on-demand drive mode.

Figure 12:
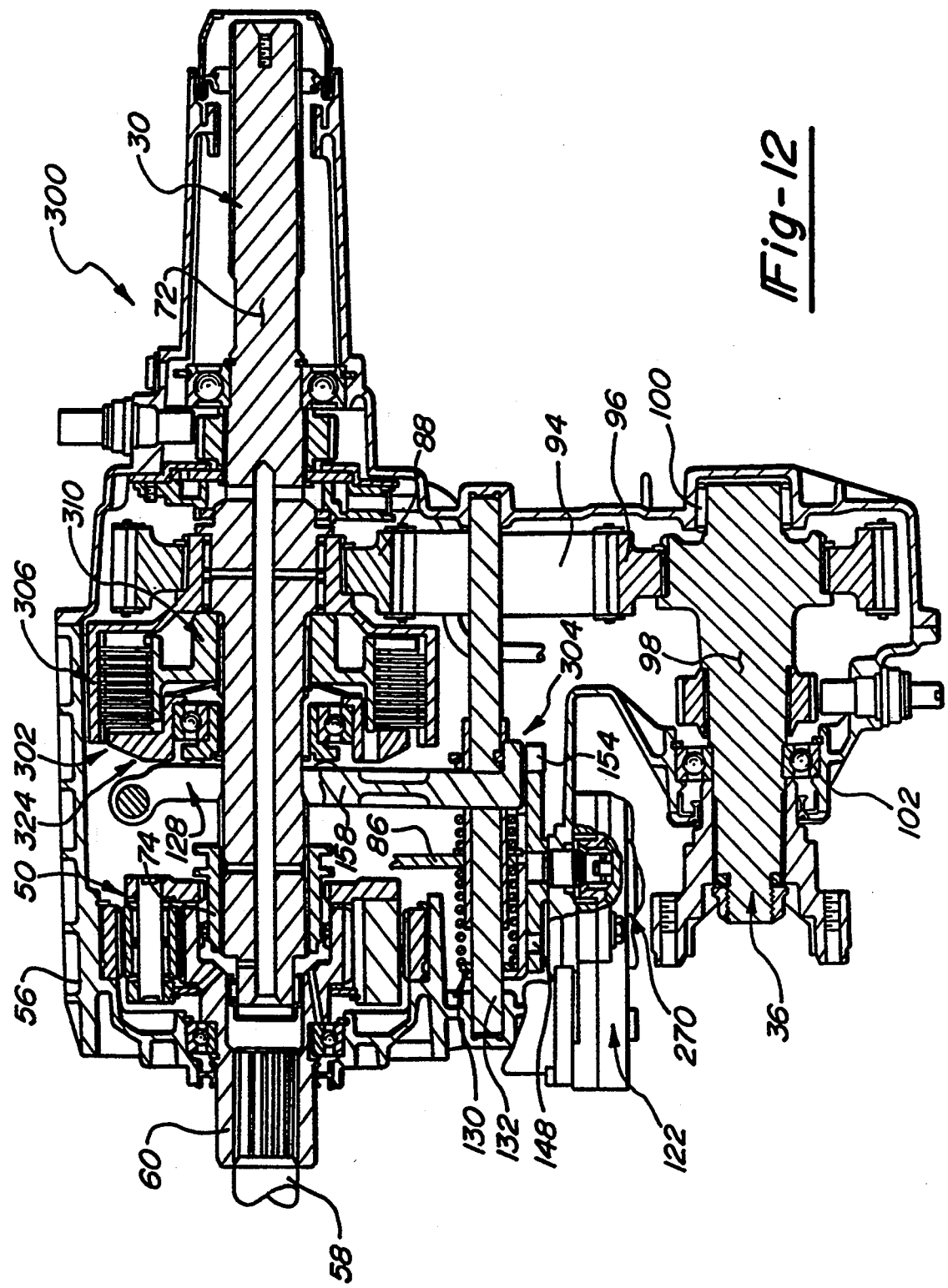
FIG. 12 is a sectional view of a transfer case constructed according to an alternative embodiment of the present invention.
Figure 13:
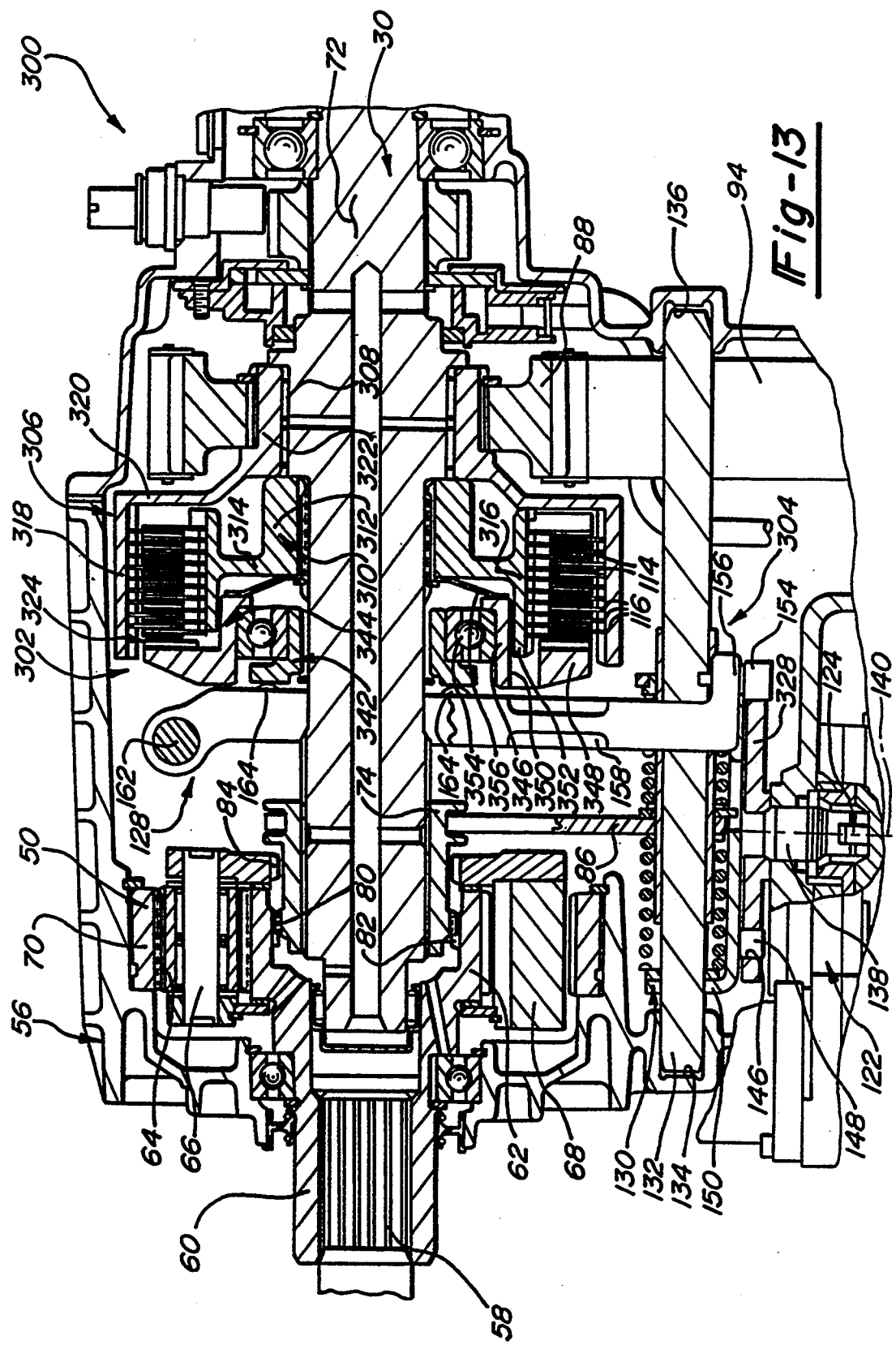
FIG. 13 is an enlarged partial view of FIG. 12.
Figure 14:
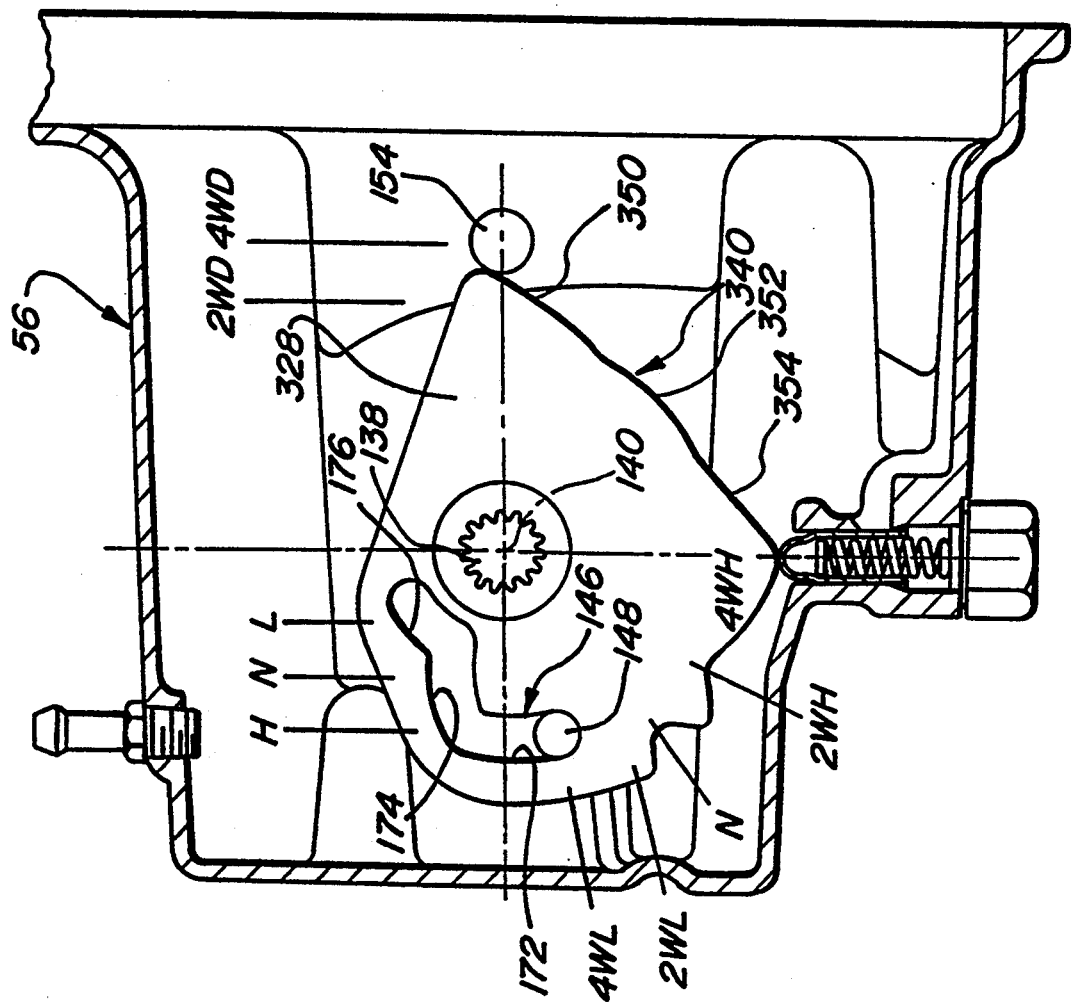
FIG. 14 is a side view of a sector plate associated with the transfer case shown in FIGS. 12 and 13.

With particular reference now to FIGS. 12 through 14, an alternative construction is shown for an electronically-controlled torque-modulatable transfer case, hereinafter designated by reference numeral 300. Preferably, transfer case 300 can be incorporated into the driveline arrangement shown in FIG. 1 for operation pursuant to the control format and characteristic relationships set forth in FIGS. 5 through 11. More preferably, the "on-demand" control schemes set forth in FIG. 6 can be slightly modified to eliminate use of an input signal from steering angle sensor 200 (FIG. 5). As such, the control constant (C) is not used in calculating the current value of the speed differential ($\Delta N$) which, in turn, is used for controlling the modulated condition of a transfer clutch 302. Accordingly, since the actuation and control of transfer case 300 is generally similar to that previously disclosed, like numbers are used to designate components thereof that are identical or substantially similar in construction and/or function to those disclosed relative to transfer case 20.

Transfer case 300 is adapted for incorporation into power transfer system 10 and includes an electronically-controlled torque transfer arrangement for transmitting drive torque to front wheels 12 in addition to rear wheels 14 for establishing the various part-time and on-demand four-wheel drive modes. In addition to planetary gear assembly 50, transfer case 300 includes a transfer clutch 302 that is operable for transferring drive torque from first output member 30 to second output member 36, thereby delivering drive torque to front wheels 12. Thus, actuator means 40 is again operable for shifting planetary gear assembly 50 between its various speed ranges as well as for actuating transfer clutch 302 in response to the mode signal generated by the mode select means 44. Thus, the vehicle operator has the option of shifting power transfer system 10 between a two-wheel high-range drive mode (2WH), a part-time four-wheel high-range drive mode (4WH), a neutral mode (N), a two-wheel low-range drive mode (2WL), a part-time four-wheel low-range drive mode (4WL) and the High-range and Low-range on-demand drive modes. As will be appreciated, any combination of the named drive modes are available with transfer case 300 and may be selectively chosen to fit a particular vehicular application.

With continued reference to FIGS. 12 through 14, the preferred construction for transfer case 300 will now be described with greater specificity. In general, transfer case 300 is substantially similar transfer case 20 with the exception that the construction and arrangement of transfer clutch 302 and drive mechanism 304 have been modified. As best seen from FIGS. 12 and 13, transfer clutch 302 is operably installed within transfer case 300 for selectively transferring drive torque from mainshaft 72 to front output shaft 98. Transfer clutch 302 is a mechanically-actuated multi-plate clutch assembly that is arranged to concentrically surround a portion of mainshaft 72. According to the particular construction shown, transfer clutch 302 includes a drive sprocket 88 that is fixed (i.e., splined) for rotation with an outer drum 306. As seen, outer drum 306 is supported on mainshaft 72 for rotation relative thereto by a suitable bearing assembly 308. As before, drive sprocket 88 drivingly engages chain 94 which, in turn, is coupled to the lower driven sprocket 96.

Transfer clutch 302 also includes an inner drum 310 that is fixed (i.e., splined) to mainshaft 72 for rotation therewith. In addition, outer drum 306 is arranged to concentrically surround inner drum 310 so as to form an internal chamber therebetween. Thus, outer drum 306 and inner drum 310 are capable of rotating relative to one another. Inner drum 310 is shown as an integral component having an annular hub 312 splined to mainshaft 72, a web 314 extending radially from annular hub 312, and a cylindrical drum 316 formed at the opposite end of web 314 and extending coaxially to hub 312. Outer drum 306 has a cylindrical drum 318 which is enclosed at one end by a cover plate 320. As seen, cover plate 320 includes an integral tubular extension 322 that is supported on bearing assembly 308.

Disposed within the internal chamber are two sets of alternately interleaved friction clutch plates that are operable for transferring drive torque from mainshaft 72 and inner drum 310 to outer drum 306 and drive sprocket 88 so as to ultimately deliver drive torque to front output shaft 98 in response to a clutch engagement force applied to the clutch plates. One set of clutch plates, referred to as inner clutch plates 114, are mounted (i.e., splined) to an outer peripheral surface of cylindrical drum 316 for driven rotation with mainshaft 72. The second set of clutch plates, referred to as outer clutch plates 116, are mounted (i.e., splined) to an inner peripheral surface of cylindrical drum 318 for rotation with drive sprocket 88 and front output shaft 98. In addition to inner clutch plates 114, a component of a sliding thrust mechanism 324 is mounted on cylindrical drum 316 of inner drum 310 for rotation therewith and axial movement with respect thereto. As will be described, thrust mechanism 324 is slidably movable on mainshaft 72 and is operable for frictionally compressing the interleaved clutch plates so as to cause drive torque to be transferred through transfer clutch 302 as a function of the clutch engagement force exerted thereon.

To provide means for selectively controlling the magnitude of the clutch engagement force exerted on thrust mechanism 324, actuator means 40 is associated with mechanical drive mechanism 304 and includes electrically-controlled rotary actuator 122. As noted, rotary actuator 122 is an electric gearmotor which is operable for generating an output torque, the value of which varies as a function of the magnitude of the electrical control signal applied thereto by controller means 46. Drive mechanism 304 is interconnected to a rotary output member 124 of rotary actuator 122 for changing the output torque into an axially-directed force used for controlling the clutch engagement force applied to thrust mechanism 324 of transfer clutch 302. To this end, drive mechanism 304 includes a pivotable lever arm assembly 128 and a sector plate 328 that is rotatably driven through a limited range of angular motion by output member 124 of rotary actuator 122. More specifically, rotation of sector plate 328 is adapted to cause pivotable movement of lever arm assembly 128 which, in turn, causes sliding movement of thrust mechanism 324 for exerting the clutch engagement force on the interleaved clutch plates. In addition, sector plate 328 is also interconnected to shift fork assembly 130 for concurrently controlling the axial position of range fork 86 and, in turn, range collar 74 in response to such controlled rotation of sector plate 328.

Actuating shaft 138 is supported from transfer case housing 56 for rotation about an axis 140. A first end of actuating shaft 138 is secured in an aperture 142 formed in sector plate 328, with its opposite end coupled to output member 124 of electrically-controlled actuator 122. Thus, actuating shaft 138 and sector plate 328 are rotated about axis 140 in response to the output torque generated by actuator 122. From FIG. 14 it can be seen that sector plate 328 may be rotated about axis 140 by actuator shaft 138 to any of five distinct sector positions, as labelled "4WH", "2WH", "N", "2WL" and "4WL". To control movement of range collar 74, sector plate 328 has range slot 146 formed therein into which range pin 148 extends. From FIG. 13 it can be seen that range pin 148 is fixed to U-shaped bracket 150 of shift fork assembly 130 which is retained for sliding movement on shift rail 132. Range slot 146 is configured to cause the desired translational movement of bracket 150, range fork 86 and range collar 74 in response to controlled bi-directional rotation of sector plate 328. To generate the desired clutch engagement force, sector plate 328 also includes a contoured peripheral edge 340 against which crowned roller 154 rests. As noted, crowned roller 154 is fixed to a flange section 156 of a pivotable lever member 158 associated with lever arm assembly 128. In general, the contour of sector edge 340 is configured to cause pivotable movement of lever member 158 in response to rotation of sector plate 328 for controlling the clutch engagement force exerted on thrust mechanism 324 of transfer clutch 302.

As best seen from FIG. 13, thrust mechanism 324 includes an annular inner bearing support 342 journally supported for sliding non-rotatable movement on mainshaft 72. While not shown, inner bearing support 342 includes an axial tang or lug which is nested within a corresponding aperture in lever arm 158 for inhibiting rotation of inner bearing support 342 relative to mainshaft 72 and inner drum 310. Thrust mechanism 324 also includes an annular outer bearing support 344 that is coupled for rotation with inner drum 310. In particular, outer bearing support 344 includes a tubular segment 346 supported for sliding axial movement relative to cylindrical hub 316, and a radial plate segment 348 which acts as a pressure plate for frictionally compressing the interleaved clutch plates. As is also seen, a series of apertures 350 are formed in plate segment 348 of outer bearing support 344. Axial lugs 352 formed on the distal end of cylindrical drum 316 are nested within apertures 350 for coupling outer bearing support 344 for rotation with, and axial movement relative to, inner drum 310. Thus, outer bearing support 344 is supported for rotation with inner drum 310 and mainshaft 72 while inner bearing support 342 is held stationary relative thereto. A thrust bearing assembly 354 is mounted between inner bearing support 342 and outer bearing support 344 for facilitating such relative rotation therebetween while accommodating the thrust forces exerted on thrust mechanism 324. A series of buttons 164 mounted to lever arm 158 act on inner bearing support 342 for causing sliding movement of the entire thrust mechanism 324 in response to pivotable movement of lever arm assembly 128 for causing the clutch engagement force to be exerted by plate segment 348 of outer bearing support 344 on the interleaved clutch plates. Finally, an annular return spring 356 is retained between inner drum 310 and outer bearing support 344 for normally biasing sliding thrust mechanism 324 toward the clutch "non-actuated" condition.

In view of incorporation of speed reduction means 50 into transfer case 300, power transfer system 10 is operable for establishing as many as seven distinct operative modes, namely the two-wheel high-range drive mode (2WH), the part-time four-wheel high-range drive mode (4WH), the Neutral mode (N), the two-wheel low-range drive mode (2WL), the part-time four-wheel low-range drive mode (4WL), the "High-range" on-demand drive mode and the "Low-range" on-demand drive mode. As described, the particular operational mode selected is established by the position of crowned roller 154 against sector edge 340 and the position of range pin 148 in range slot 146 as a result of the angular position of sector plate 328. It will be appreciated, however, that some traditional four-wheel drive applications will most probably exclude the "Low-range" on-demand drive mode and the two-wheel low-range drive mode, but such exclusion is merely optional.

In operation, the vehicle operator selects the desired operative mode via mode select means 44 which, in turn, signals controller means 46 of the selection. Thereafter, controller means 46 generates an electrical control signal that is applied to actuator 122 for controlling the rotated position of sector plate 328. Moreover, for each of the (2WH), (4WH), (N), (2WL) and (4WL) operative drive modes, sector plate 328 is controllably rotated to a corresponding predefined sector position. However, when one of the "on-demand" drive modes is selected, power transfer system 10 is operable for modulating the clutch engagement force applied to transfer clutch 302 as a function of various system and operator initiated inputs.

With particular reference now to FIG. 14, means are disclosed for coordinating the axial movement of shift fork assembly 130 and the pivotal movement of lever arm assembly 128 upon rotation of sector plate 328 between the various sector positions for establishing the desired combination of drive modes and speed ranges. In general, the contour of range slot 146 is defined by first, second and third cam pathways 172, 174 and 176, respectively, which respectively correspond to first, second and third edge segments 350, 352 and 354, respectively, associated with peripheral sector edge 340. As will be appreciated, edge segments 350, 352 and 354 of sector plate 328 are similar in function to cam pathways 178, 180 and 182 of sector plate 126 (FIG. 4) except that sector plate 126 was designed to "pull" lever assembly 128 toward the 4WD positions while sector plate 328 is designed to "push" lever arm assembly 128 toward the 4WD positions.

In the 4WH sector position shown, crowned roller 154 is positioned against sector edge 340 in close proximity to the terminal end of first edge segment 350 for establishing a four-wheel drive (4WD) position. With crowned roller 154 in the four-wheel drive (4WD) position, lever arm assembly 128 exerts a maximum clutch engagement force on thrust mechanism 324 such that transfer clutch 302 is considered to be operating in the fully "actuated" or "locked-up" condition. As such, drive torque is transferred from mainshaft 72 and inner drum 310 through the interleaved clutch plates to outer drum 306 and, in turn, to front output shaft 98. In addition, range pin 148 is shown positioned within range slot 146 in close proximity to the terminal end of first cam pathways 172 for positioning range collar 74 in the high-range ("H") speed position. Accordingly, when mode select means 44 signals that the vehicle operator has selected the part-time four-wheel high-range drive mode, controller means 46 send a control signal to actuator 122 for generating sufficient output torque to rotate sector plate 328 to its 4WH sector position shown.

As sector plate 328 is caused to rotate about axis 140 in a first (i.e., counterclockwise) direction from the position shown, the arcuate contour of first edge segment 350 causes axial displacement of crowned roller 154 toward a two-wheel drive (2WD) position. In turn, such movement of crowned roller 154 causes concurrent pivotable movement of lever arm assembly 128 in a direction away from transfer clutch 302 which results in a proportional decrease in the clutch engagement force exerted on thrust mechanism 324. Moreover, once crowned roller 154 is in the two-wheel drive (2WD) position, lever arm assembly 128 does not exert an engagement force on thrust mechanism 324 which is sufficient to transfer drive torque through transfer clutch 302, whereby transfer clutch 302 is considered to be in the "non-actuated" condition. Concurrent with such movement of crowned roller 154 against first edge segment 350 toward the two-wheel drive (2WD) position, range pin 148 is guided within first cam pathway 172 of range slot 146 for maintaining range collar 74 in the high-range (H) speed position. As such, when mode select means 44 signals that the vehicle operator has selected the two-wheel high-range drive mode, controller means 46 sends a control signal to actuator 122 for causing sector plate to rotate to its 2WH sector position. When the "High-range" on-demand mode is selected, actuator 122 is preferably actuated in accordance with the previously disclosed relationships established in response to the current value of the sensor input signals for rotatably driving sector plate 328 to any position between its 2WH and 4WH sector positions. Thus, the amount of torque transferred to front output shaft 98 through transfer clutch 302 is proportional to the clutch engagement force, the value of which is determined by the particular position of crowned roller 154 between the two-wheel drive (2WD) position and the four-wheel drive (4WD) position that is established upon controlled bi-directional rotation of sector plate 328 between its 2WH and 4WH sector positions.

Power transfer system 10 is also operable to permit transfer case 300 to be shifted into the Neutral mode, the two-wheel low-range drive mode and the part-time four-wheel low-range drive mode. More particularly, upon mode select means 44 signalling selection of one of these modes, actuator 122 is actuated for causing sector plate 328 to rotate in the first direction for concurrently guiding crowned roller 154 against second edge segment 352 of sector edge 340 and range pin 148 within second cam pathway 174 of range slot 146. The contour of second edge segment 352 is designed to retain crowned roller 154 in the two-wheel drive (2WD) position upon rotation of sector plate 338 between its 2WH and 2WL sector positions, whereby transfer clutch 302 is maintained in its non-actuated condition. However, during such rotation of sector plate 338, range pin 148 is axially displaced due to the contour of second cam pathway 174 for sequentially shifting range collar 74 from the high-range (H) speed position into the Neutral (N) speed position and lastly into the low-range (L) speed position. Thus, during "range" shifting of range collar 74, sector plate 328 is configured to maintain transfer clutch 302 in its non-actuated condition to eliminate the possibility of over-loading. Finally, when the part-time four-wheel low-range drive mode is selected, sector plate 328 is rotated in the first direction through the N sector position and the 2WL sector position prior to entering into the 4WL sector position. However, upon movement of sector plate 328 between its 2WL and 4WL sector positions, crowned roller 154 exits second edge segment 352 and is guided against third edge segment 354 of sector edge 340 for movement from the two-wheel drive (2WD) position toward the four-wheel drive (4WD) position. Concurrently, range pin 148 is guided within third cam pathway 176 to maintain range collar 74 in the low-range (L) speed position, thereby establishing the part-time four-wheel low-range drive mode.

During "on-demand" operation, a power transfer system equipped with transfer case 300 functions to continuously monitor and regulate the torque transfer characteristics in a manner that is independent of any deliberate action by the vehicle operator. As noted, the amount of torque transferred through transfer clutch 302 during "High-range" on-demand operation is proportional to the clutch engagement force, the value of which is determined by the particular position of crowned roller 154 against first edge segment 350 due to controlled rotation of sector plate 328 between its 2WH and 4WH sector positions. Similarly, "Low-range" on-demand operation is established by controlling the position of crowned roller 154 against third edge segment 354 due to controlled rotation of sector plate 328 between its 2WL and 4WL sector positions. In either case, the distribution ratio of drive torque between front output shaft 98 and mainshaft 72 of transfer case 300 may be selectively varied as a function of changes in the magnitude of the control signal for optimizing the tractive performance characteristics. As noted, the control parameters and relationships used for controlling torque distribution through transfer case 300 are generally similar to, or modified versions of, those set forth in FIGS. 5 through 11 for transfer case 20.

Figure 15:
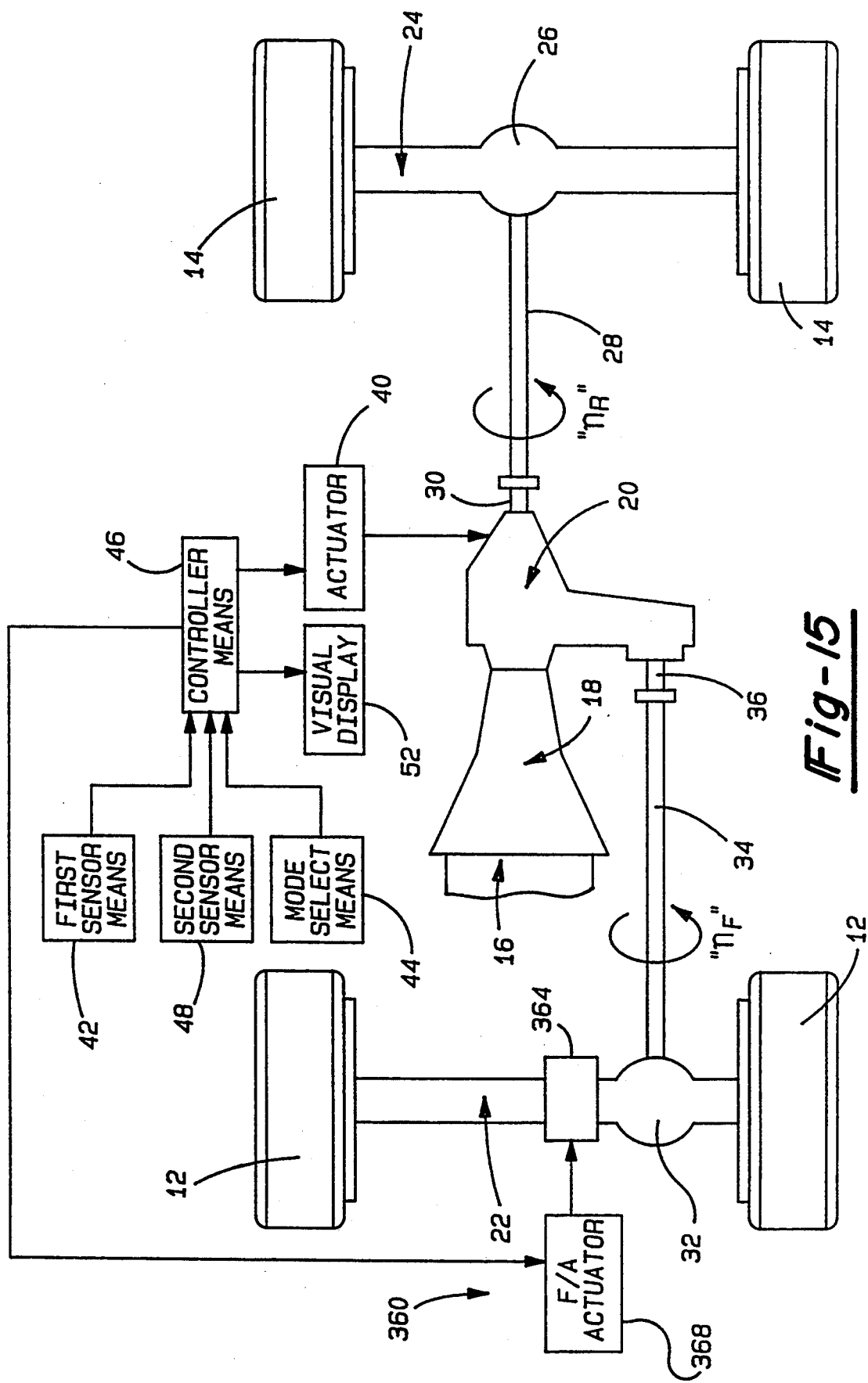
FIG. 15 is a schematic representation of a modified power transfer system adapted for use in four-wheel drive motor vehicles of the type equipped with an axle disconnect system.

With reference now to FIGS. 15 through 19, a modified driveline arrangement for a four-wheel drive motor vehicle is schematically shown to be interactively associated with power transfer system 10 of the present invention. In general, the driveline shown in FIG. 15 is substantially identical to that shown in FIG. 1 with the exception that an automatic axle disconnect system 360 has been incorporated into power transfer system 10. Thus, the following disclosure is directed to the use of power transfer system 10 in motor vehicle driveline configurations equipped with an axle disconnect system capable of allowing the non-driven wheels to be disconnected from the remainder of its associated driveline connection to transfer case 300 so as to rotate free thereof when the motor vehicle is operating in the Neutral mode or one of the available two-wheel drive modes. Incorporation of an axle disconnect system is desireable since, upon disconnection from front wheels 12, the front driveline components (i.e., front drive shaft 34, front output 36, drive sprocket 88 and outer drum 306 of transfer clutch 302) are not rotatable driven in response to rolling movement of front wheels 12. As will be described, the control system for power transfer system 10 also controls axle disconnect system 360 for automatically coupling front wheels 12 to the front driveline components in response to a mode signal indicating that the vehicle operator has shifted into one of the available four-wheel drive or on-demand modes.

Figure 16:
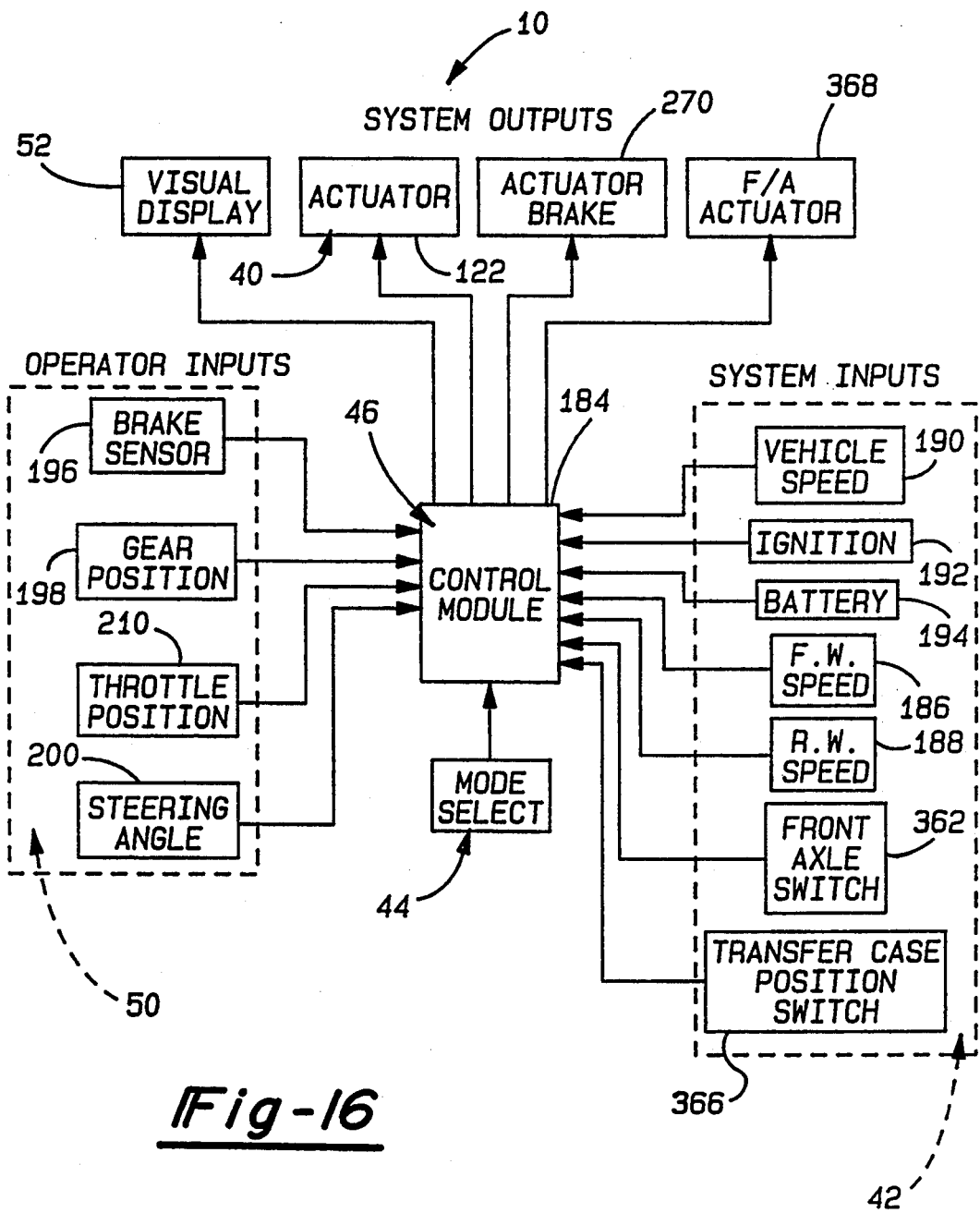
FIG. 16 is a block diagram of a control system for use with the power transfer system of FIG. 15.

With particular reference to FIG. 16, an exemplary block diagram for the control system associated with the power transfer system of FIG. 15 is now shown. As seen, the block diagram is generally a modified version of that shown in FIG. 5 with new "system inputs" having been added to first sensor means 42 that are inputted to control module 184. Preferably, these new system inputs include a front axle sensor or switch 362 for signalling whether an axle connect mechanism 364 is in a "coupled" mode or an "un-coupled" mode. In addition, a transfer case sensor 366 is provided for signalling the current operating mode of transfer case 300. Also shown is the addition of another "system output", generically referred to hereinafter as front axle actuator 368.

Figure 17:
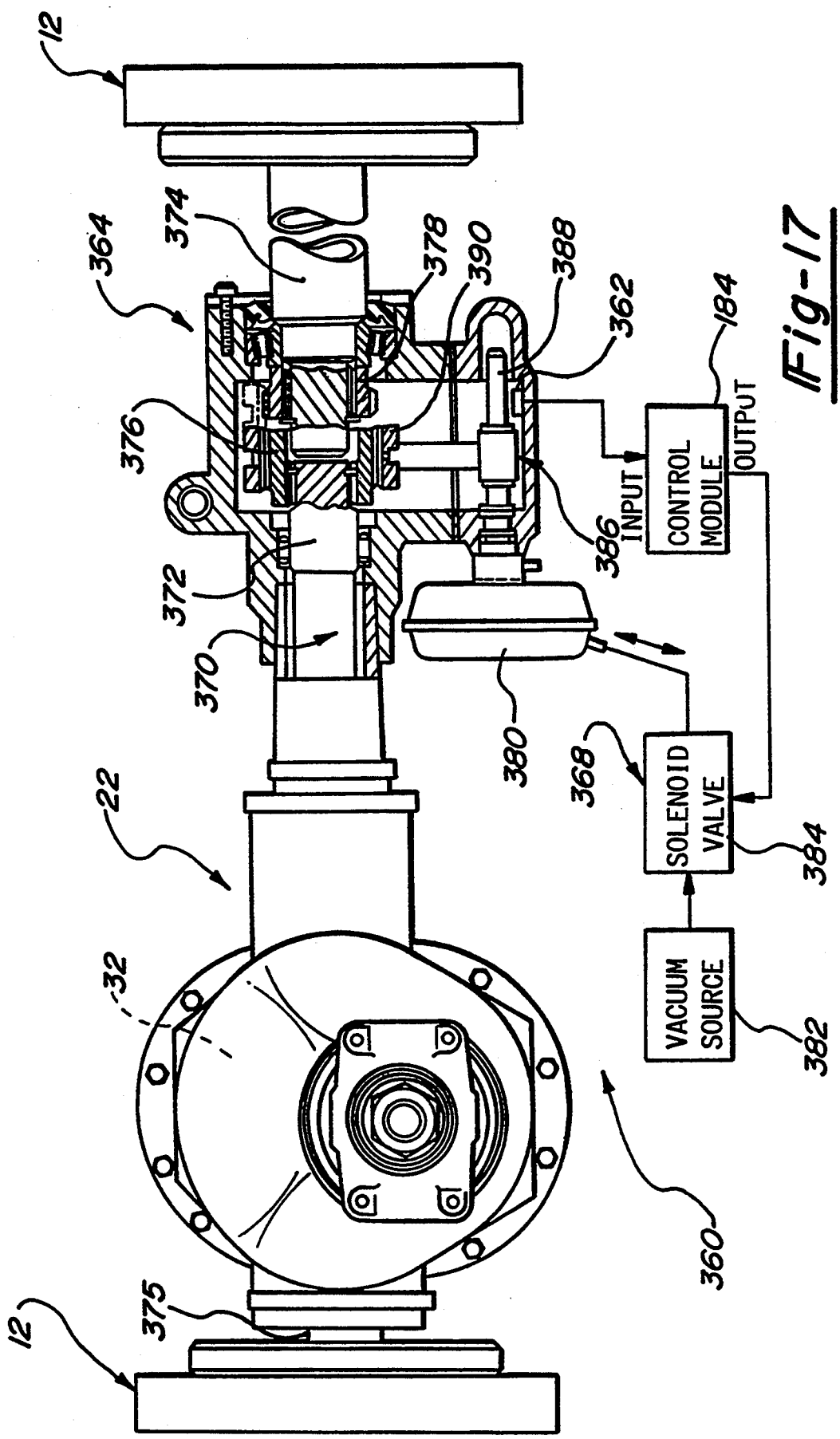
FIG. 17 is a side view, partially broken away, of an exemplary front axle assembly having an axle connect mechanism incorporated therein and which is controlled by the power transfer system of the present invention.

Referring now to FIG. 17, there is shown a portion of an exemplary front axle assembly 22 which is pertinent to understanding the incorporation of axle disconnect system 360 into power transfer system 10 of the present invention. However, it is to be understood that the particular front axle assembly shown is merely illustrative in nature and is not intended to limit the present invention. In general, front axle assembly 22 includes front differential 32, axle connect mechanism 364, a shaft assembly 370 and front wheels 12. In particular, shaft assembly 370 has a first shaft 372 and that is coupled to drive or be driven by front differential 32, and a second shaft 374 that is coaxially aligned on a common longitudinal axis with first shaft 372 and rotatably connected to one of front wheels 12 in a conventional manner. As is also conventional, the other one of front wheels 12 is rigidly coupled by shaft 375 to drive or be driven by front differential 32 in a well known manner. Finally, a first clutch gear 376 is mounted for rotation with first shaft 372 while a second clutch gear 378 is mounted for rotation with second shaft 374.

Front axle disconnect system 360 has a first operating mode that is associated with two-wheel drive operation of the motor vehicle wherein first and second shafts 372 and 374, respectively, are not coupled together but rather are free to rotate independently of one another. In this first operating mode, rolling movement of front wheels 12 does not drive front differential 32. Thus, no rotary motion is transferred from front wheels 12 through differential 32 to front drive shaft 34, front output 36, driven sprocket 96, chain 94, drive sprocket 88 and outer drum 306 of transfer clutch 302 during motive operation of the motor vehicle. In addition, axle disconnect system 360 also has a second operating mode wherein shafts 372 and 374 are rigidly coupled for co-rotation such that front wheels 12 are coupled to front output 36 of transfer case 300 via front differential 32 and drive shaft 34. This second mode of operation is preferably associated with four-wheel drive operation of the motor vehicle.

Axle disconnect system 360 is shown to also include a vacuum motor 380 that is in fluid communication with a vacuum source 382, such as the vacuum from the intake manifold of engine 16. In the embodiment shown, front axle actuator 368 is an electronically-controlled solenoid valve 384 that can be selectively controlled for opening and closing a communication circuit between vacuum source 382 and vacuum motor 380. Axle connect mechanism 364 is shown to include a shift fork assembly 386 that is coupled to an axially movable output shaft 388 of vacuum motor 380 for axially shifting a clutch collar 390 between positions corresponding to the first and second operating modes of axle disconnect system 360. As seen, clutch collar 390 is retained for rotation with and axial sliding movement on first clutch gear 376. Thus, the axial position of shift fork assembly 386 and clutch collar 390 are controlled by the actuated condition of vacuum motor 380. In the first operating mode, clutch collar 390 is, as shown, located in a first or "de-coupled" position in engagement only with first clutch gear 376. In this position, shafts 372 and 374 are disconnected and front differential 32 is disconnected from front wheels 12. In the second operating mode, clutch collar 390 shifted to a second or "coupled" position (shown in phantom) for coupling first clutch gear 376 for rotation with second clutch gear 378, thereby connecting shafts 372 and 374 for common rotation. In this position, front differential 32 is capable of transferring power from transfer case 300 through the connected shafts to front wheels 12. In operation, control module 184 generates an output signal for selectively actuating solenoid control valve 384 for shifting vacuum motor shaft 388 between its retracted and extended positions which, in turn, causes corresponding movement of clutch collar 390 between its de-coupled and coupled positions. As will further be described, front axle disconnect system 360 is preferably shifted into the second mode under substantially synchronous speed conditions (i.e., $n_F=n_R$), With reference now to FIG. 18, a control sequence for the selection and subsequent automatic control of transfer case 300 and axle disconnect system 360 when the "High-range" on-demand drive mode is selected is shown in flow chart 400. In general, flow chart 400 represents a sequence of operations performed by electronic control module 184 and which are diagrammatically shown in block form. If a mode signal is sent to control module 184 indicating selection of the on-demand mode, as indicated by block 402, then block 404 represents the next control step wherein control mode module 184 determines the current mode of axle disconnect system 360, as indicated by the signal from front axle switch 362. If front axle switch 362 signals that clutch collar 390 is in its coupled position, then block 406 indicates the control step of jumping into the pre-existing on-demand control sequence, as set forth in FIG. 6 at block 216. However, if front axle switch 362 signals that clutch collar 390 is in its de-coupled position, then control module 184 sends a control signal to actuator 122 for controllably rotating sector plate 328 to its 4WH sector position, as indicated by block 408. Thereafter, brake 270 is engaged as indicated by block 410. In this lock-up condition, transfer clutch 302 is fully actuated for rotatably driving front output 36 and front drive shaft 34.

Figure 18:
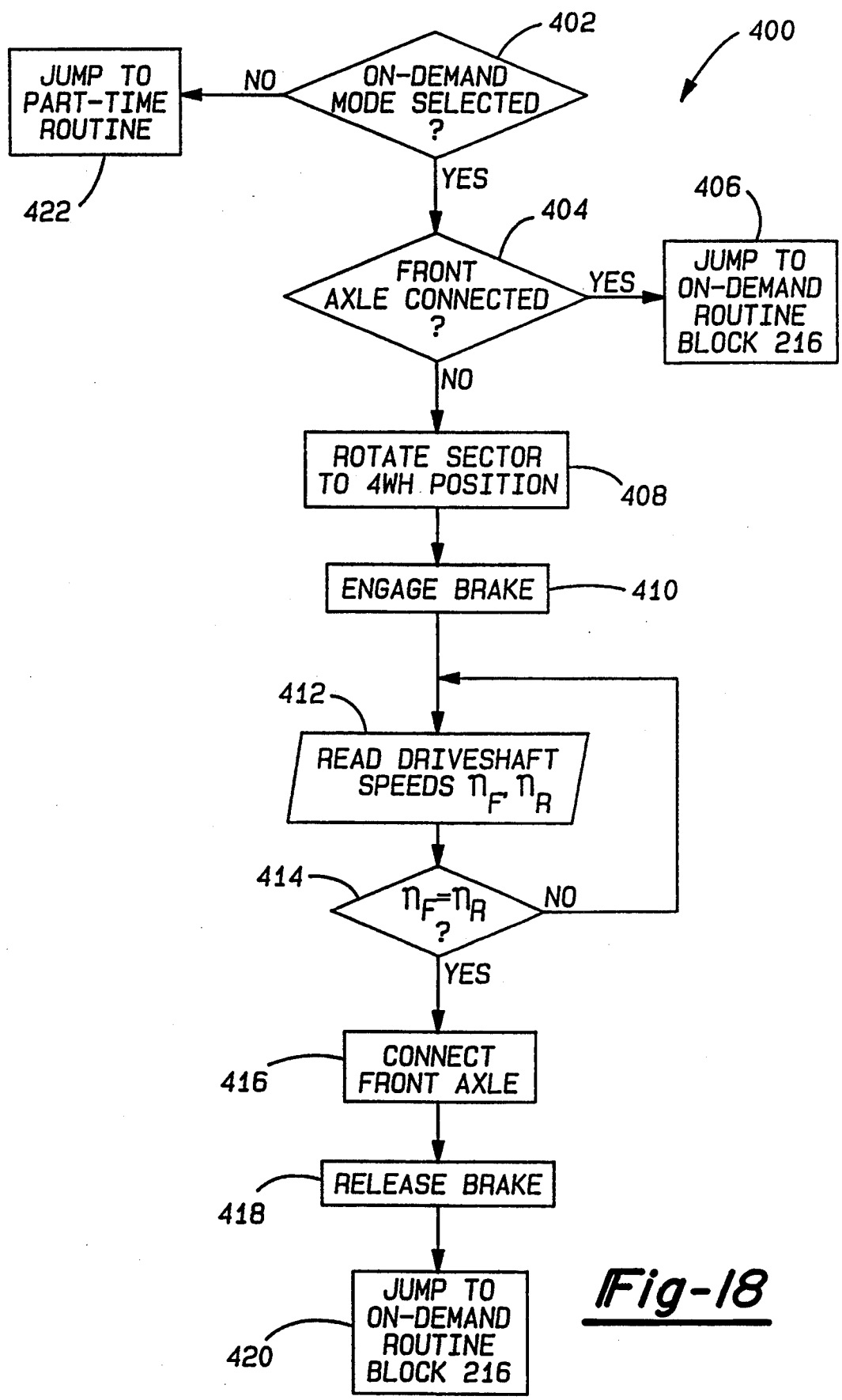
FIGS. 18 and 19 are flow charts depicting control sequences for the control system of FIG. 16.

Block 412 is representative of the control step in which the current values for the rotational speed of front drive shaft 34 ($n_F$) and rear drive shaft 28 ($n_R$) are read. Next, block 414 represents the step of determining whether the speed of front drive shaft 34 is synchronous ($n_F=n_R$) with rear drive shaft 28. As noted by block 416, upon confirmation of speed synchronization, control module 184 sends a control signal to solenoid control valve 384 for actuating vacuum motor 380 to move clutch collar 390 to its "coupled" position. Once connected, front axle switch 362 sends an appropriate signal to control module 184. As shown by block 418, brake 270 is thereafter released and sector plate 328 is back-driven to its 2WH sector position. With front axle assembly 22 now connected, the subsequent on-demand operation of power transfer system 10 is accomplished according to the control sequence shown in flow chart 210 of FIG. 6, as indicated by block 420. As will be appreciated, FIG. 18 illustrates an "anticipation" circuit wherein the non-driven front driveline is connected for driven rotation with transfer case 300 in preparation for on-demand four-wheel drive operation. It will also be appreciated that a similar anticipation circuit would be employed in power transfer systems wherein the vehicle operator has the ability to select the "Low-range" on-demand drive mode.

Figure 19:
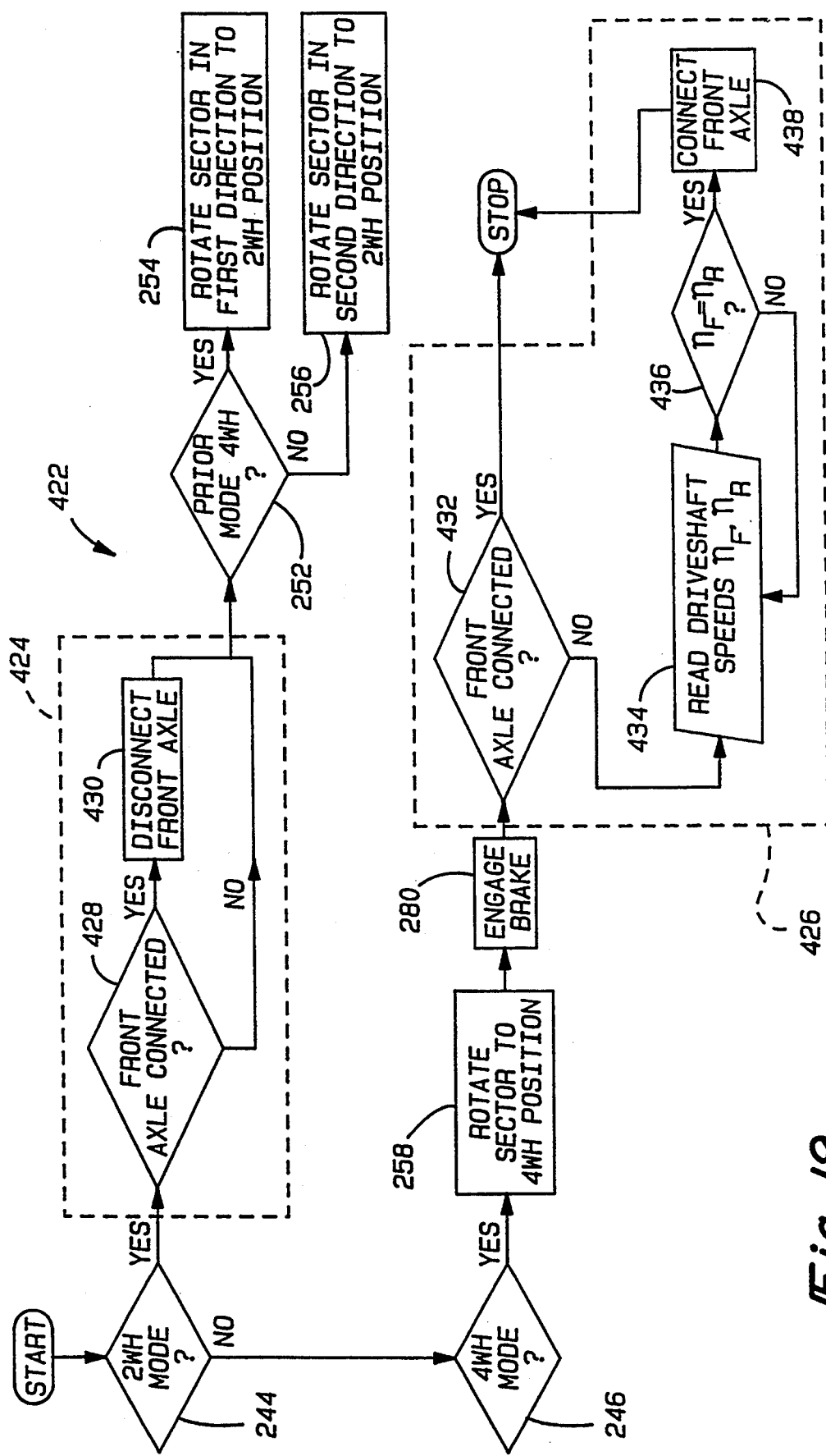

If any mode other than an on-demand mode is selected, then the control sequence jumps to a part-time routine, as indicated by flow chart 422 of FIG. 19. As will be appreciated, flow chart 422 is a modified version of a portion of the part-time routine shown in FIG. 11 and is adapted to automatically disconnect front axle assembly 22 when any available two-wheel drive or neutral mode is selected as well as automatically connect front axle assembly 22 when any available part-time four-wheel drive mode is selected. While flow chart 422 illustrates an exemplary sequence of operations, hereinafter referred to as "axle disconnect sub-routine" 424, performed for selectively disconnecting front axle assembly 22 upon selection of the two-wheel high-range drive mode (2WH), it is to be understood that a similar sub-routine would likewise be incorporated into the control sequence shown in FIG. 11 for selectively disconnecting front axle assembly 22 when either of the Neutral mode (N) or two-wheel low-range drive mode (2WL) is selected. In a similar manner, flow chart 422 also illustrates another exemplary control sequence, hereinafter referred to as "axle connect sub-routine" 426 for controlling actuation of axle disconnect system 360 upon selection of the part-time four-wheel high-range drive mode (4WH). It will again be understood that a similar sub-routine would be employed for controlling actuation of axle disconnect system 360 when the part-time four-wheel low-range drive mode (4WL) is selected.

As previously noted, blocks 244, 246, 248, 272 and 250 of FIG. 11 represent the sequential steps of determining which of the two-wheel high-range drive mode (2WH), the part-time four-wheel high-range drive mode (4WH), the neutral mode (N), the two-wheel low-range drive mode (2WL) or the part-time four-wheel low-range drive mode (4WL), respectively, was selected as signalled by mode select means 44. With reference to FIG. 19, axle disconnect sub-routine 424 and axle connect sub-routine 426 associated with controlling actuation of axle disconnect system 360 will now be described. If the two-wheel high-range drive mode (2WH) is selected, block 428 indicates the step of determining the current operating mode of axle disconnect system 360. If front axle switch 362 signals that clutch collar 390 is in its coupled position, then block 430 represents the step of control module 184 sending a signal to solenoid control valve 384 for causing movement of clutch collar 390 to its de-coupled position, thereby disconnecting front axle assembly 22. Thereafter, rotation of sector plate 328 to its 2WH sector position is controlled in the previously disclosed manner. Similarly, if front axle switch 362 signals that clutch collar 390 is already in its de-coupled position, then rotation of sector plate 328 to its 2WH sector position is again controlled according to the previously disclosed control sequence. Alternatively, axle disconnect sub-routine 424 could be incorporated into the part-time routine to control actuation of axle disconnect system 360 subsequent to controlled rotation of sector plate 328 to the desired sector position. As noted, a similar sequence is preferably utilized for controlling axle disconnect system 360 following selection by the vehicle operator of either the Neutral mode (N) or the two-wheel low-range drive mode (2WL).

With regard to axle connect sub-routine 426, if block 246 indicates that the vehicle operator has selected the part-time four-wheel high-range drive mode (4WH), then sector plate 328 is first rotated to its 4WH sector position and brake 270 is engaged, as respectively represented by blocks 258 and 280. As such, transfer clutch 302 is fully actuated and drive torque is transferred to front drive shaft 34. Block 432 indicates the control step of determining the current operating mode of axle disconnect system 360. If front axle switch 362 signals that clutch collar 390 is in its coupled position such that front axle assembly 22 is already connected, then axle disconnect system 360 is maintained in its second mode. However, if front axle switch 362 signals that clutch collar 390 is in its de-coupled position, then block 434 representative of the control step of reading the rotational speed of the front and rear drive shafts and block 436 represents the step of determining whether speed synchronization between front drive shaft 34 and rear drive shaft 28 has been obtained. Once speed synchronization is confirmed, control module 184 sends a signal to solenoid control valve 384 for actuating vacuum motor 380 to move clutch collar 390 to its coupled position, thereby connecting front wheels 12 to the driven front driveline, as indicated by block 438, for delivering drive torque thereto. Again, a similar control sequence is employed to control actuation of axle disconnect system 360 following selection of the part-time four-wheel low-range drive mode (4WL).

The foregoing discussion discloses and describes preferred embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A power transfer system for a motor vehicle having a source of power capable of generating drive torque, comprising:

a first axle assembly having a first differential interconnecting a first set of wheels;

a second axle assembly having a second differential, a second set of wheels, an axle disconnect mechanism movable between a decoupled position for disconnecting said second set of wheels from said second differential and a coupled position for connecting said second set of wheels to said second differential, and a first actuator for moving said axle disconnect mechanism between said coupled and decoupled positions;

first sensor means for sensing and generating a first input signal indicative of the position of said axle disconnect mechanism;

a transfer case having an input shaft rotatably driven by the power source, a first output shaft interconnected to said first differential for transmitting drive torque from the power source to said first set of wheels for establishing a two-wheel drive mode, a second output shaft interconnected to said second differential, a transfer clutch for selectively transmitting drive torque from said first output shaft to said second output shaft for establishing a four-wheel drive mode, said transfer clutch being operable for varying the drive torque transmitted therethrough by varying a clutch engagement force, a drive mechanism movable between a first position whereat a minimum clutch engagement force is generated and a second position whereat a maximum clutch engagement force, is generated and a second actuator for moving said drive mechanism between said first and second positions;

second sensor means for detecting an operating characteristic of the vehicle and generating a second input signal indicative thereof;

mode select means for enabling a vehicle operator to select one of said two-wheel drive mode, a part-time four-wheel drive mode, and an on-demand drive mode, said mode select means being operable to generate a mode signal indicative of the particular mode selected; and controller means for controlling actuation of said first and second actuators in response to said first and second input signals and said mode signal, said controller means operable for causing said first actuator to move said axle disconnect mechanism to said decoupled position and said second actuator to move said drive mechanism to said first position when said mode signal indicates selection of said two-wheel drive mode, said controller means operable for causing said first actuator to move said axle disconnect mechanism to said coupled position and said second actuator to move said drive mechanism to said second position when said part-time four-wheel drive mode is selected, and said controller means operable for causing said first actuator to move said axle disconnect mechanism to said coupled position and said second actuator to vary the position of said drive mechanism between said first and second positions as a function of said second input signal for varying the drive torque transmitted through said transfer clutch when said on-demand drive mode is selected.

2. The power transfer system of claim 1 wherein upon said mode signal indicating selection of said on-demand drive mode, said controller means causes said second actuator to move said drive mechanism to said second position and then cause said first actuator to move said axle disconnect mechanism to said coupled position once the rotational speed of said second output shaft is equal to the rotational speed of said first output shaft.

3. The power transfer system of claim 2 wherein said second sensor means is operable for sensing a variable vehicular operating characteristic and for generating said second input signal having a magnitude corresponding thereto, whereby following movement of said axle disconnect mechanism to said coupled position during operation in said on-demand mode, said controller means cause said second actuator to move said drive mechanism to said first position for normally delivering drive torque only to said first set of wheels until the magnitude of said second input signal exceeds a predetermined minimum value whereat said drive mechanism is moved toward said second position for transmitting drive torque through said transfer clutch to said second set of wheels.

4. The power transfer system of claim 1 wherein said second sensor means is operable for sensing the rotational speed of said first and second output shafts and generating a speed differential signal indicative of a speed difference therebetween, and wherein said controller means causes said second actuator to move said drive mechanism to said first position when the value of said speed differential signal is less than a predetermined minimal value, and said controller means causing said second actuator to move said drive mechanism to said second position in response to said speed differential signal having a value greater than a predetermined maximum value.

5. The power transfer system of claim 4 wherein said drive mechanism includes a lever arm supported for pivotable movement between said first and second positions, and a rotatable sector plate interconnected to said lever arm such that rotation of said sector plate toward a two-wheel .drive position causes corresponding pivotable movement of said lever arm toward said first position and rotation of said sector plate toward a four-wheel drive position causes corresponding pivotable movement of said lever arm toward said second position, and wherein said second actuator is an electrically-controlled device having a rotatable output member coupled to said sector plate for controlling rotation thereof in response to the magnitude of a control signal supplied thereto by said controller means.

6. The power transfer system of claim 4 wherein said controller means actuates said second actuator for increasing the magnitude of drive torque transferred through said transfer clutch in response to increasing values of said speed differential signal between said predetermined minimum and maximum values.

7. The power transfer system of claim 1 wherein said transfer case includes a speed reduction apparatus driven by said input shaft for establishing a high-range drive and a reduced-ratio low-range drive, said speed reduction apparatus having a shift mechanism movable between a first position for establishing said high-range drive and a second position for establishing said low-range drive, said transfer case further including a movement coordinating apparatus for coordinating movement of said shift mechanism and said drive mechanism, said movement coordinating apparatus being movable between a 2WH position whereat said shift mechanism is in said first position and said drive mechanism is in said first position to establish a two-wheel high-range drive mode, a 4WH position whereat said shift mechanism is in said first position and said drive mechanism is in said second position for establishing a part-time four-wheel high-range drive mode, and a 4WL position whereat said shift mechanism is in said second position and said drive mechanism is in said second position to establish a part-time four-wheel low-range drive mode.

8. The power transfer system of claim 7 wherein said mode select means enables said vehicle operator to select one of said two-wheel high-range drive mode, said part-time four-wheel high-range drive mode, said part-time four-wheel low-range drive mode and an on-demand high-range drive mode, said controller means operable for causing said second actuator to move said movement coordinating apparatus to said 2WH position when said mode signals indicates selections of said two-wheel high-range drive mode, said controller means causing said second actuator to move said movement coordinating apparatus to said 4WH position when said mode signal indicates selection of said four-wheel high-range drive mode is selected, said controller means causing said second actuator to move said movement coordinating apparatus to said 4WL position when said mode signal indicates selection of said four-wheel low-range drive mode, and said controller means causing said second actuator to modulate the position of said movement coordinating apparatus between said 2WH and 4WH positions as a function of the magnitude of said second input signal for modulating the amount of drive torque transmitted to said second set of wheels when said on-demand high-range mode is selected.

9. The power transfer system of claim 7 wherein said mode select means further enables said vehicle operator the ability to select a two-wheel low-range drive mode such that said controller means causes said second actuator to move said movement coordinating apparatus to a 2WL position whereat said shift mechanism is in said second position and said drive mechanism is in said first position.

10. The power transfer system of claim 9 wherein said mode select means is further operable to enable selection of an on-demand low-range drive mode such that said controller means causes said second actuator to continuously control the position of said movement coordinating apparatus between said 2WL and 4WL positions as a function of the magnitude of said second input signal.

11. The power transfer system of claim 10 wherein upon selection of said on-demand low-range drive mode said controller means causes said second actuator to move said movement coordinating apparatus to said 4WL position, thereafter said controller means causes said first actuator to move said axle disconnect mechanism to said coupled position when the rotational speed of said second output shaft is synchronous with the rotational speed of said first output shaft, and wherein said controller means thereafter causes said second actuator to move said movement coordinating apparatus to said 2WL position following movement of said axle disconnect mechanism to said coupled position.

12. The power transfer system of claim 7 wherein said mode select means is further operable to enable selection of an on-demand low-range drive mode such that said controller means causes said second actuator to continuously control the position of said movement coordinating apparatus between a 2WL position and said 4WL position as a function of the magnitude of said second input signal, movement of said movement coordinating apparatus to said 2WL position causes movement of said shift mechanism to said second position and said drive mechanism to said first position.

13. A four-wheel drive system for a vehicle having an engine, and primary and secondary wheel pairs, comprising:
a transfer case having a first output for transmitting drive torque from the engine to the primary wheel pair, a second output for transmitting drive torque from the engine to the secondary wheel pair, and a transfer clutch capable of continuously varying the torque transmitted from said first output to said second output by varying a clutch engagement force;
drive means for generating said clutch engagement force, said drive means movable between a first position whereat a minimum clutch engagement force is generated and a second position whereat a maximum clutch engagement force is generated;
coupling means for selectively interconnecting said second output to the secondary wheel pair, said coupling means being movable between a de-coupled position disconnecting said second output from the secondary wheel pair and a coupled position connecting said second output to the secondary wheel pair;
first sensor means for detecting the position of said coupling means and generating a first input signal in response thereto;
second sensor means for sensing an operating characteristic of the vehicle and generating a second input signal in response thereto;
mode select means for permitting a vehicle operator to select one of a part-time four-wheel drive mode and an on-demand drive mode and generate a mode signal indicative of the particular mode selected; and
controller means for controlling movement of said drive means and said coupling means in response to said first and second input signals and said mode signal, said controller means causing movement of said coupling means to said coupled position following movement of said drive means to said second position when either of said part-time four-wheel drive mode and said on-demand drive mode is selected, and said controller means thereafter causing movement of said drive means to said first position when said on-demand drive mode is selected, said controller means further operable for thereafter modulating the position of said drive means between said first and second positions for varying the torque transmitted by said transfer clutch to said secondary wheel pair in response to a corresponding variation in said secondary input signal during subsequent operation in said on-demand drive mode.

14. The four-wheel drive system of claim 13 wherein said second sensor means is operable for sensing the rotational speed of said first and second outputs and generating a speed differential signal that is indicative of a speed difference therebetween, and wherein during operation in said on-demand drive mode said controller means causes movement of said drive means to said first position when the value of said speed differential signal is less than a predetermined minimal value and movement of said drive means to said second position when the value of said speed differential signal is greater than a predetermined maximum value, said controller means being further operable for moving said drive means from said first position toward said second position in response to increasing values of said speed differential signal between said predetermined minimum and maximum values so as to cause a corresponding increase in the magnitude of drive torque transferred through said transfer clutch.

15. The four-wheel drive system of claim 13 wherein said mode select means is further operable for permitting selection of a two-wheel drive mode, said controller means causing movement of said drive means to said first position and said coupling means to said de-coupled position in response to a mode signal indicating selection of said two-wheel drive mode.

16. The four-wheel drive system of claim 13 wherein said transfer case includes a speed reduction apparatus driven by an input from the engine for establishing a high-range drive and a reduced-ratio low-range drive with said first output, said speed reduction apparatus having a shift mechanism movable between a first range position for establishing said high-range drive and a second range position for establishing said low-range drive, said transfer case further including a movement coordinating apparatus for coordinating movement of said shift mechanism and said drive means with said movement coordinating apparatus being movable between a 2WH position whereat said shift mechanism is in said first range position and said drive means is in said first position, a 4WH position whereat said shift mechanism is in said first range position and said drive means is in said second position, and a 4WL position whereat said shift mechanism is in said second range position and said drive means is in said second position.

17. The four-wheel drive system of claim 16 wherein said mode select means is operable to signal selection of one of a part-time four-wheel high-range drive mode and an on-demand high-range drive mode such that upon said mode signal indicating selection of said part-time four-wheel high-range drive mode said controller means causes said movement coordinating apparatus to move to said 4WH position, and wherein upon said mode signal indicating selection of said on-demand high-range drive mode said controller means continuously varies the position of said movement coordinating apparatus between said 2WH and 4WH positions in response to variations in said second input signal.

18. The four-wheel drive system of claim 17 wherein said mode select means is operable to signal selection of a part-time four-wheel low-range drive mode such that said controller means cause said movement coordinating apparatus to move to said 4WL position.

19. The four-wheel drive system of claim 18 wherein said mode select means is operable to signal selection of a two-wheel low-range drive mode such that said controller means causes said movement coordinating apparatus to move to a 2WL position whereat said shift mechanism is in said second range position and said drive means is in said first position.

20. The four-wheel drive system of claim 19 wherein said mode select means is operable to signal selection of an on-demand low-range drive mode such that said controller means continuously controls the position of said movement coordinating apparatus between said 2WL and 4WL positions in response to variations in said second input signal.

21. The four-wheel drive system of claim 18 wherein said mode select means is operable to signal selection of an on-demand low-range drive mode such that said controller means continuously controls the position of said movement coordinating apparatus between a 2WL position and said 4WL position in response to variations in said second input signal, movement of said movement coordinating apparatus to said 2WL position causes movement of said shift mechanism to said second range position and said drive means to said first position.

22. The four-wheel drive system of claim 17 wherein said shift mechanism of said speed reduction apparatus is movable to a third range position for interrupting power transmission between said input and said first output for establishing a neutral non-driven mode.

23. The four-wheel drive system of claim 18 wherein said shift mechanism of said speed reduction apparatus is movable to a third range position for interrupting power transmission between said input and said first output for establishing a neutral non-driven mode.

24. The four-wheel drive system of claim 21 wherein said shift mechanism of said speed reduction apparatus is movable to a third range position for interrupting power transmission between said input and said first output for establishing a neutral non-driven mode.

25. A power transfer system for a motor vehicle having an engine and first and second sets of wheels, said power transfer system comprising:

a transfer case having an input rotatably driven by the engine, a first output interconnecting said input member to the first set of wheels for transmitting drive torque from the engine to the first set of wheels, a second output interconnected to the second set of wheels, a speed reduction apparatus driven by said input and having a shift member movable between a first range position for directly coupling said first output to said input for establishing a high-range drive and a second range position for coupling said first output to said speed reduction mechanism for establishing a low-range drive, and a clutch assembly for selectively transmitting drive torque from said first output to said second output by varying a clutch engagement force;

drive means for generating said clutch engagement force, said drive means movable between a first mode position whereat a minimum clutch engagement force is generated and a second mode position whereat a maximum clutch engagement force is generated;

movement coordinating means for coordinating the movement of said shift member and said drive means, said movement coordinating means being movable between a 2WH position whereat said shift member is in said first range position and said drive means is in said first mode position, a 4WH position whereat said shift member is in said first range position and said drive means is in said second mode position, and a 4WL position whereat said shift member is in said second range position and said drive means is in said second mode position;

coupling means for selectively interconnecting said second output to the second set of wheels, said coupling means movable between a de-coupled position disconnecting said second output from the second set of wheels and a coupled position connecting said second output to the second set of wheels;

first sensor means for detecting the position of said coupling means and generating a first input signal in response thereto;

second sensor means for sensing a speed differential between said first and second outputs and generating a second input signal in response thereto;

mode select means for permitting a vehicle operator to select one of a two-wheel high-range drive mode, a part-time four-wheel high-range drive mode, a part-time four-wheel low-range drive mode, and an on-demand high-range drive mode and generate a mode signal indicative of the particular mode selected; and controller means for controlling movement of said movement coordinating means and said coupling means in response to said first and second input signals and said mode signal, said controller means causing movement of said coupling means to said de-coupled position and movement of said movement coordinating means to said 2WH position when said mode signal indicates selection of said two-wheel high-range drive mode, said controller means causing movement of said coupling means to said coupled position following movement of said movement coordinating means to said 4WH position when either of said part-time four-wheel high-range drive mode and said on-demand high-range drive mode is selected, and said controller means thereafter causing movement of said movement coordinating means to said 2WH position when said on-demand high-range drive mode is selected, said controller means further operable for thereafter continuously controlling the position of said movement coordinating means between said 2WH and 4WH positions in response to a corresponding variation in the magnitude of said second input signal during subsequent operation in said on-demand drive mode, and wherein said controller means is operable for causing movement of said coupling means to said coupled position and movement of said movement coordinating means to said 4WL position when said mode signal indicates selection of said part-time four-wheel low-range drive mode.

26. The power transfer system of claim 25 wherein during operation in said on-demand high-range drive mode said controller means causes movement of said movement coordinating means to said 2WH position when the value of said second input signal is less than a first threshold limit and causes movement of said movement coordinating means to said 4WH position when the value of said second input signal exceeds a second threshold limit, whereby the drive torque transferred through said clutch assembly is controlled by changing the position of said movement coordinating means between said 2WH and 4WH positions in response to corresponding changes in the value of said second input signal between said first and second threshold limits.

27. The power transfer system of claim 25 wherein said mode select means further enables selection of a two-wheel low-range drive mode such that said coupling means is moved to said de-coupled position and said movement coordinating means is moved to said 2WL position.

28. The power transfer system of claim 27 wherein said mode select means is operable to signal selection of an on-demand low-range drive mode such that said controller means controls the position of said movement coordinating means between said 2WL and 4WL positions in response to variations in said second input signal.

29. The power transfer system of claim 25 wherein said mode select means is operable to signal selection of an on-demand low-range drive mode such that said controller means controls the position of said movement coordinating means between a 2WL position and said 4WL position in response to variations in said second input signal, said 2WL position is established when said shift member in said second range position and said drive means in said first mode position.

30. The power transfer system of claim 25 wherein said shift mechanism of said speed reduction apparatus is movable to a third range position for interrupting power transmission between said input and said first output for establishing a neutral non-driven mode.

31. The power transfer system of claim 27 wherein said shift mechanism of said speed reduction apparatus is movable to a third range position for interrupting power transmission between said input and said first output for establishing a neutral non-driven mode.

32. The power transfer system of claim 3 wherein said second sensor means is operable for sensing the rotational speed of said first and second output shafts and generating a speed differential signal indicative of a speed difference therebetween, and wherein following movement of said axle disconnect mechanism to said coupled position when operating in said on-demand drive mode said controller means causes said second actuator to move said drive mechanism to said first position when the value of said speed differential signal is below said predetermined minimum value, to move said drive mechanism to said second position when the value of said speed differential signal exceeds a predetermined maximum value, and to vary the position of said drive mechanism between said first and second positions as a function of a corresponding variation in said speed differential signal between its predetermined minimum and maximum values.

33. The power transfer system of claim 4 wherein upon said mode signal indicating selection of said on-demand drive mode said controller means causes said second actuator to move said drive mechanism to said second position and thereafter causes said first actuator to move said axle disconnect mechanism to said coupled position when said speed differential signal indicates synchronous rotation of said first and second output shafts.

* * * * *

UNITED STATES PATENT AND TRADEMARK OFFICE
CERTIFICATE OF CORRECTION

PATENT NO. : 5,411,110            Page 1 of 2
DATED : May 2, 1995
INVENTOR(S) : Robert J. Wilson, David Sperduti, Randy W. Adler It is certified that error appears in the above-indentified patent and that said Letters Patent is hereby corrected as shown below:

Column 1, line 30, delete ".".

Column 2, line 47, delete ".".

Column 7, line 38, "from" should be --front--.

Column 17, line 37, after "similar" insert --to--.

Column 22, line 42, "rotatable" should be --rotatably--.

Column 24, line 7, "," (second occurrence in Patent) should be --.--.

Column 26, line 59, claim 1, delete ",".

Column 27, line 66, claim 5, delete ".".

UNITED STATES PATENT AND TRADEMARK OFFICE
CERTIFICATE OF CORRECTION

PATENT NO. : 5,411,110

DATED : May 2, 1995

INVENTOR(S) : Robert J. Wilson, David Sperduti, Randy W. Adler

It is certified that error appears in the above-indentified patent and that said Letters Patent is hereby corrected as shown below:

Column 34, line 1, claim 29, after "member" insert --is--.

Column 34, line 2, claim 29, after "means" insert --is--.

Signed and Sealed this

Twenty-seventh Day of February, 1996

*Attest:*

BRUCE LEHMAN

*Attesting Officer*     *Commissioner of Patents and Trademarks*